United States Patent

(12) United States Patent
Zhang

(10) Patent No.: US 11,516,412 B2
(45) Date of Patent: Nov. 29, 2022

(54) IMAGE PROCESSING METHOD, IMAGE PROCESSING APPARATUS AND ELECTRONIC DEVICE

(71) Applicant: GUANGDONG OPPO MOBILE TELECOMMUNICATIONS CORP., LTD., Guangdong (CN)

(72) Inventor: Xueyong Zhang, Guangdong (CN)

(73) Assignee: GUANGDONG OPPO MOBILE TELECOMMUNICATIONS CORP., LTD., Dongguan (CN)

( * ) Notice: Subject to any disclaimer, the term of this patent is extended or adjusted under 35 U.S.C. 154(b) by 17 days.

(21) Appl. No.: 16/815,177

(22) Filed: Mar. 11, 2020

(65) Prior Publication Data

US 2020/0226729 A1 Jul. 16, 2020

Related U.S. Application Data

(63) Continuation of application No. PCT/CN2018/105121, filed on Sep. 1, 2018.

(30) Foreign Application Priority Data

Sep. 11, 2017 (CN) .......................... 201710811471.4
Sep. 11, 2017 (CN) .......................... 201710811778.4
(Continued)

(51) Int. Cl.
*G06T 7/194* (2017.01)
*G06T 5/50* (2006.01)
(Continued)

(52) U.S. Cl.
CPC ............... *H04N 5/272* (2013.01); *G06T 5/50* (2013.01); *G06T 7/0002* (2013.01); *G06T 7/174* (2017.01);
(Continued)

(58) Field of Classification Search
CPC ...... H04N 5/272; H04N 5/2354; H04N 9/735; G06T 7/194; G06T 7/50; G06T 7/174;
(Continued)

(56) References Cited

U.S. PATENT DOCUMENTS

2002/0037103 A1   3/2002   Hong et al.
2003/0071905 A1   4/2003   Yamasaki
(Continued)

FOREIGN PATENT DOCUMENTS

CN    1306722 A    8/2001
CN    1411277 A    4/2003
(Continued)

OTHER PUBLICATIONS

English translation of OA for CN application 201710812003.9.
(Continued)

*Primary Examiner* — Bernard Krasnic
(74) *Attorney, Agent, or Firm* — Young Basile Hanlon & MacFarlane, P.C.

(57) ABSTRACT

An image processing method, an image processing apparatus, an electronic device and a computer readable storage medium are provided. The image processing method includes the following. A background image and a portrait region image of a current user that a preset parameter of the background image matching the preset parameter of the portrait region image are acquired. The portrait region image and the background image are merged to obtain a merged image.

15 Claims, 22 Drawing Sheets

(30) Foreign Application Priority Data

| | | | |
|---|---|---|---|
| Sep. 11, 2017 | (CN) | ................ | 201710811814.7 |
| Sep. 11, 2017 | (CN) | ................ | 201710812003.9 |
| Sep. 11, 2017 | (CN) | ................ | 201710812062.6 |
| Sep. 11, 2017 | (CN) | ................ | 201710812524.4 |
| Sep. 11, 2017 | (CN) | ................ | 201710812528.2 |
| Sep. 11, 2017 | (CN) | ................ | 201710812662.2 |
| Sep. 11, 2017 | (CN) | ................ | 201710813504.9 |
| Sep. 11, 2017 | (CN) | ................ | 201710813584.8 |
| Sep. 11, 2017 | (CN) | ................ | 201710813585.2 |
| Sep. 11, 2017 | (CN) | ................ | 201710813591.8 |
| Sep. 11, 2017 | (CN) | ................ | 201710813674.7 |

(51) Int. Cl.
*H04N 5/272* (2006.01)
*H04N 5/235* (2006.01)
*H04N 9/73* (2006.01)
*G06T 7/50* (2017.01)
*G06T 7/174* (2017.01)
*G06T 7/00* (2017.01)

(52) U.S. Cl.
CPC ............ *G06T 7/194* (2017.01); *G06T 7/50* (2017.01); *H04N 5/2354* (2013.01); *H04N 9/735* (2013.01); *G06T 2207/20221* (2013.01); *G06T 2207/30201* (2013.01)

(58) Field of Classification Search
CPC ............ G06T 5/50; G06T 7/0002; G06T 2207/20221; G06T 2207/30201
See application file for complete search history.

(56) References Cited

U.S. PATENT DOCUMENTS

| | | | |
|---|---|---|---|
| 2004/0212725 A1 | 10/2004 | Raskar | |
| 2005/0195317 A1 | 9/2005 | Myoga | |
| 2006/0029275 A1 | 2/2006 | Li et al. | |
| 2006/0187321 A1 | 8/2006 | Sakamoto | |
| 2009/0167928 A1 | 7/2009 | Asukabe et al. | |
| 2011/0109620 A1 | 5/2011 | Hong et al. | |
| 2011/0299772 A1 | 12/2011 | Janssen | |
| 2012/0229650 A1 | 9/2012 | Matthews | |
| 2013/0120451 A1* | 5/2013 | Sasaki | G06T 5/50 345/633 |
| 2013/0136350 A1 | 5/2013 | Pai et al. | |
| 2013/0229413 A1 | 9/2013 | Geggie et al. | |
| 2014/0362188 A1* | 12/2014 | Yokokawa | A63F 13/213 348/47 |
| 2016/0057363 A1 | 2/2016 | Posa | |
| 2018/0115717 A1* | 4/2018 | Kao | H04N 5/3572 |
| 2020/0211197 A1 | 7/2020 | Zhang | |

FOREIGN PATENT DOCUMENTS

| | | | |
|---|---|---|---|
| CN | 101150737 A | 3/2008 | |
| CN | 101577831 A | 11/2009 | |
| CN | 101677386 A | 3/2010 | |
| CN | 101835023 A | 9/2010 | |
| CN | 102663810 A | 9/2012 | |
| CN | 102868872 A | 1/2013 | |
| CN | 103104839 A | 5/2013 | |
| CN | 103606182 A | 2/2014 | |
| CN | 103685976 A | 3/2014 | |
| CN | 103985114 A | 8/2014 | |
| CN | 104182950 A | 12/2014 | |
| CN | 104268928 A | 1/2015 | |
| CN | 104486606 A | 4/2015 | |
| CN | 104599314 A | 5/2015 | |
| CN | 104660918 A | 5/2015 | |
| CN | 104853172 A | 8/2015 | |
| CN | 104902189 A | 9/2015 | |
| CN | 104917938 A | 9/2015 |
| CN | 105100491 A | 11/2015 |
| CN | 105187810 A | 12/2015 |
| CN | 105227837 A | 1/2016 |
| CN | 105306862 A | 2/2016 |
| CN | 105430317 A | 3/2016 |
| CN | 105450949 A | 3/2016 |
| CN | 105741343 A | 7/2016 |
| CN | 105868735 A | 8/2016 |
| CN | 105872400 A | 8/2016 |
| CN | 105872448 A | 8/2016 |
| CN | 205430735 U | 8/2016 |
| CN | 106027916 A | 10/2016 |
| CN | 106303162 A | 1/2017 |
| CN | 106303250 A | 1/2017 |
| CN | 106340025 A | 1/2017 |
| CN | 106412643 A | 2/2017 |
| CN | 106447741 A | 2/2017 |
| CN | 106485720 A | 3/2017 |
| CN | 106502512 A | 3/2017 |
| CN | 106534683 A | 3/2017 |
| CN | 106548455 A | 3/2017 |
| CN | 106612393 A | 5/2017 |
| CN | 106791473 A | 5/2017 |
| CN | 106803888 A | 6/2017 |
| CN | 106844722 A | 6/2017 |
| CN | 106850941 A | 6/2017 |
| CN | 106851124 A | 6/2017 |
| CN | 106851238 A | 6/2017 |
| CN | 106909911 A | 6/2017 |
| CN | 106937039 A | 7/2017 |
| CN | 106937049 A | 7/2017 |
| CN | 106937059 A | 7/2017 |
| CN | 106954034 A | 7/2017 |
| CN | 106980381 A | 7/2017 |
| CN | 206322194 U | 7/2017 |
| CN | 106997603 A | 8/2017 |
| CN | 107025635 A | 8/2017 |
| CN | 107096224 A | 8/2017 |
| CN | 107610077 A | 1/2018 |
| CN | 107610078 A | 1/2018 |
| CN | 107610080 A | 1/2018 |
| CN | 107613224 A | 1/2018 |
| CN | 107644439 A | 1/2018 |
| CN | 107665478 A | 2/2018 |
| CN | 107682645 A | 2/2018 |
| CN | 107705277 A | 2/2018 |
| CN | 107707831 A | 2/2018 |
| CN | 107707834 A | 2/2018 |
| CN | 107707838 A | 2/2018 |
| CN | 107734264 A | 2/2018 |
| CN | 107734267 A | 2/2018 |
| CN | 108256497 A | 7/2018 |
| EP | 1100262 A1 | 5/2001 |
| JP | 2004134950 A * | 4/2004 |
| JP | 2004134950 A | 4/2004 |
| JP | 2006229616 A | 8/2006 |
| JP | 2016123517 A | 7/2016 |
| WO | 2009155204 A2 | 12/2009 |
| WO | 2019047985 A1 | 3/2019 |

OTHER PUBLICATIONS

English translation of OA for CN application 201710812062.6.
English translation of OA for CN application 201710812662.2.
English translation of OA for CN application 201710813585.2.
English translation of OA date Aug. 1, 2019 for CN application 201710813584.8.
English translation of Reconnaissance image acquisition and fusion technology.
English translation of OA date Nov. 14, 2019 for CN application 201710813584.8.
English translation of OA for CN application 201710812528.2.
English translation of OA for CN application 201710813674.7.
English translation of OA date Apr. 22, 2019 for CN application 201710813591.8.
English translation of OA date Oct. 8, 2019 for CN application 201710813591.8.

(56) References Cited

OTHER PUBLICATIONS

English translation of OA for CN application 201710812524.4.
English translation of OA date May 20, 2019 for CN application 201710811814.7.
English translation of OA date Dec. 3, 2019 for CN application 201710811814.7.
English translation of OA for CN application 201710813504.9.
English translation of OA date May 25, 2019 for CN application 201710811778.4.
English translation of OA date Nov. 29, 2019 for CN application 201710811778.4.
English translation of OA for CN application 201710811471.4.
English translation of Decision of Rejection 201710811471.4.
English translation of ISR for PCT application PCT/CN2018/105121.
Indian Examination Report for IN Application 202017015758 dated Jul. 15, 2021. (7 pages).
Extended European Search Report for EP Application 18852861.6 dated Oct. 2, 2020.
Automatic Real-Time Video Matting Using Time-of-Flight Camera and Multichannel Poisson Equations; Liang Wang · Minglun Gong · Chenxi Zhang; Received: Sep. 9, 2010 | Accepted: May 23, 2011 /Published online: Jun. 15, 2011 © Springer Science+Business Media, LLC 2011; 18 pages.
Human Detection Using Depth Information by Kinect; Lu Xia, Chia-Chih Chen and J. K. Aggarwal; The University of Texas at Austin; Department of Electrical and Computer Engineering; 8 pages.
Tangible Video Teleconference System Using Real-Time Image-Based Relighting; Sae-Woon Ryu, Sang Hwa Lee, Sang Chul Ahn, and Jong-Il Park, Member, IEEE; IEEE Transactions on Consumer Electronics, vol. 55, No. 3, Aug. 2009; 7 pages.
Practical automatic background substitution for live video; Haozhi Huang1 , Xiaonan Fang1, Yufei Ye1 , Songhai Zhang1 (IBI), and Paul L. Rosin2; Computational Visual Media DOI 10.1007 /s41095-016-0074-0; vol. 3, No. 3, Sep. 2017, 273-284; 12 pages.
Towards Real-time Mixed Reality Matting in Natural Scenes; Nicholas Beato; University of Florida; Stars; 108 pages.
New Trends on Dynamic Object Segmentation in Video Sequences: A Survey; Ramirez A. Graciela and Chacon M. Mario I.; vol. 11 No. I, Dec. 2013; 14 pages.
Non-Final Office Action for U.S. Appl. No. 16/815,179 dated Mar. 31, 2021. (38 pages).
Chinese Notice of review of Office Action with English Translation for CN Application 201710812528.2, dated Aug. 10, 2022 (21 pages).

\* cited by examiner acquiring a background image and a portrait region image of a current user that a preset parameter of the background image matches the preset parameter of the portrait region image — 101 merging the portrait region image and the background image to obtain a merged image — 102 truncated phase image of the object to be measured
truncated phase image of the reference plane
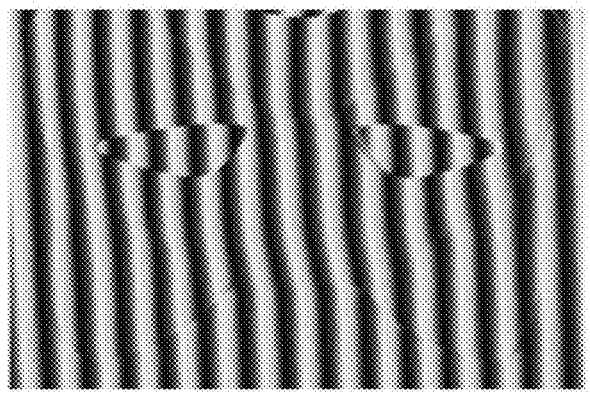
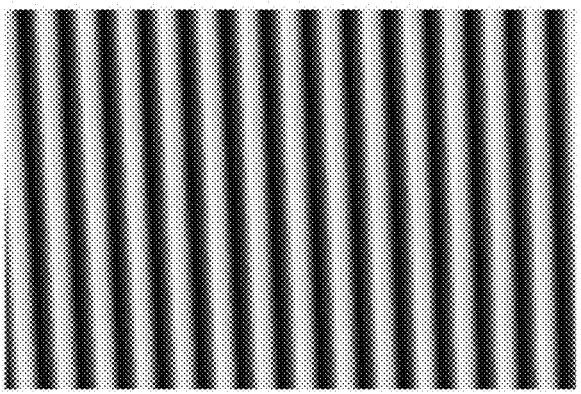
FIG. 21C
continuous phase image of the object to be measured
continuous phase image of the reference plane
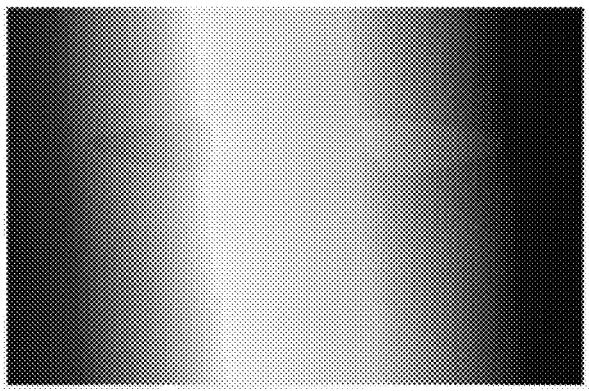
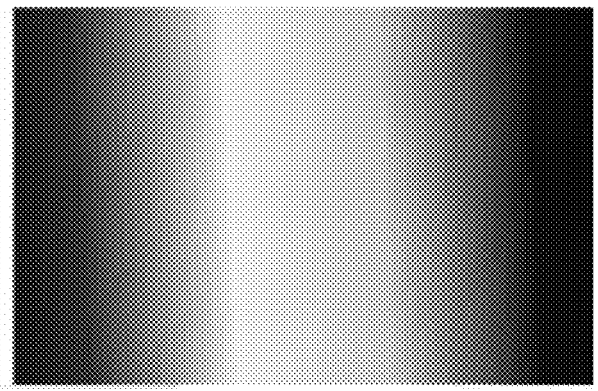
FIG. 21D in response to determining that the resolution of the first portrait region image is greater than the resolution of the first target background image, performing the interpolation processing on the first target background image to obtain the second target background image, the resolution of the second target background image matches the resolution of the first portrait region image — 339 in response to determining that the resolution of the first portrait region image is less than the resolution of the first target background image, performing the interpolation processing on the first portrait region image to obtain the second portrait region image, the resolution of the second portrait region image matches the resolution of the first target background image — 340

FIG. 23

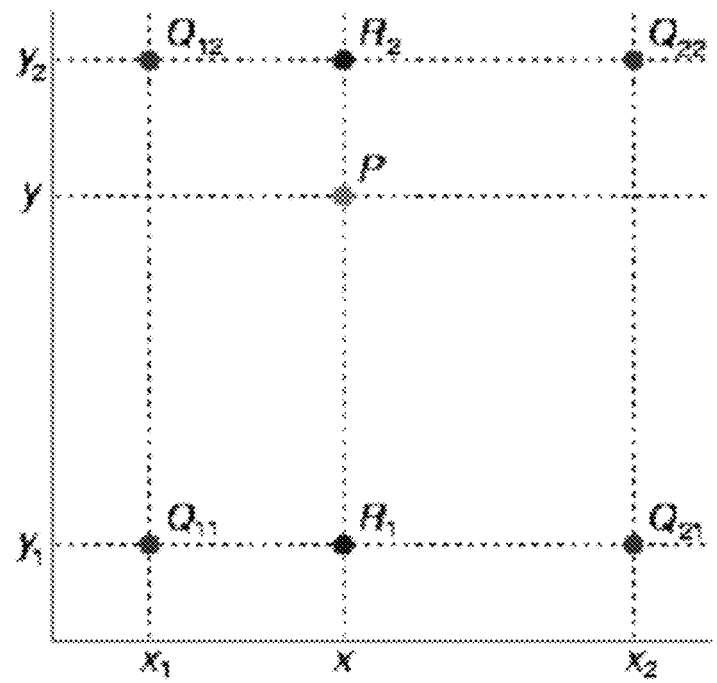

FIG. 24

IMAGE PROCESSING METHOD, IMAGE PROCESSING APPARATUS AND ELECTRONIC DEVICE

CROSS-REFERENCE TO RELATED APPLICATION(S)

This application is a continuation application of International Patent Application No. PCT/CN2018/105121, filed on Sep. 11, 2018, which claims priority to Chinese Patent Application Nos. 201710813591.8, 201710811471.4, 201710812528.2, 201710812662.2, 201710811814.7, 201710813584.8, 201710811778.4, 201710812062.6, 201710813504.9, 201710812003.9, 201710813674.7, 201710813585.2, and 201710812524.4, all filed on Sep. 11, 2017, the entire disclosure of all of which are hereby incorporated by reference in their entireties.

TECHNICAL FIELD

The present disclosure relates to image processing technologies, and more particularly, to an image processing method, an image processing apparatus, an electronic device and a computer readable storage medium.

BACKGROUND

An existing technology of merging a portrait and a virtual background usually extracts a portrait to be merged from an image including the portrait, and adds the extracted portrait to the virtual background.

SUMMARY

The image processing method includes: acquiring a background image and a portrait region image of a current user, a preset parameter of the background image matching the preset parameter of the portrait region image; and merging the portrait region image and the background image to obtain a merged image.

The image processing apparatus according to implementations of the present disclosure is integrated in the electronic device. The image processing apparatus includes a visible light camera, a depth image collection component and a processor. The visible light camera and the depth image collection component are configured to acquire a background image and a portrait region image of a current user, a preset parameter of the background image matching the preset parameter of the portrait region image. The processor is configured to merge the portrait region image and the background image to obtain a merged image.

The computer readable storage medium according to implementations of the present disclosure includes a computer program that may be used in combination with an electronic device capable of photographing, wherein the computer program may be executed by a processor to implement the image processing method as described above.

Additional aspects and advantages of embodiments of present disclosure will be given in part in the following descriptions, become apparent in part from the following descriptions, or be learned from the practice of the embodiments of the present disclosure.

BRIEF DESCRIPTION OF DRAWINGS

The above and additional aspects and advantages of embodiments of the present disclosure will become apparent and more readily appreciated from the following descriptions made with reference to the accompanying drawings, in which:

FIGS. 21A to 21E are schematic diagrams illustrating a measurement scenario of structured light according to embodiments of the present disclosure.

FIG. 23 a schematic flowchart illustrating another image processing method according to embodiments of the present disclosure.

FIG. 24 is a diagram illustrating an image processing method according to embodiments of the present disclosure.

DETAILED DESCRIPTION

Embodiments of the present disclosure are described below in detail and examples of the embodiments are shown in accompanying drawings. Same or similar reference signs throughout the description represent the same or similar components or components that have the same or similar functions. Embodiments described below with reference to the accompanying drawings are illustrative, intended to explain the present disclosure, and not construed to limit the present disclosure.

In a practical application, two images to be merged may have differences from each other. As a result, a merged image obtained by simply translating and resizing may have a poor merging effect.

Therefore, the present disclosure provides an image processing method, an image processing apparatus, an electronic device, and a storage medium.

An image processing method and an image processing apparatus according to embodiments of the present disclosure will be described below with reference to the accompanying drawings.

Figures 1, 2:
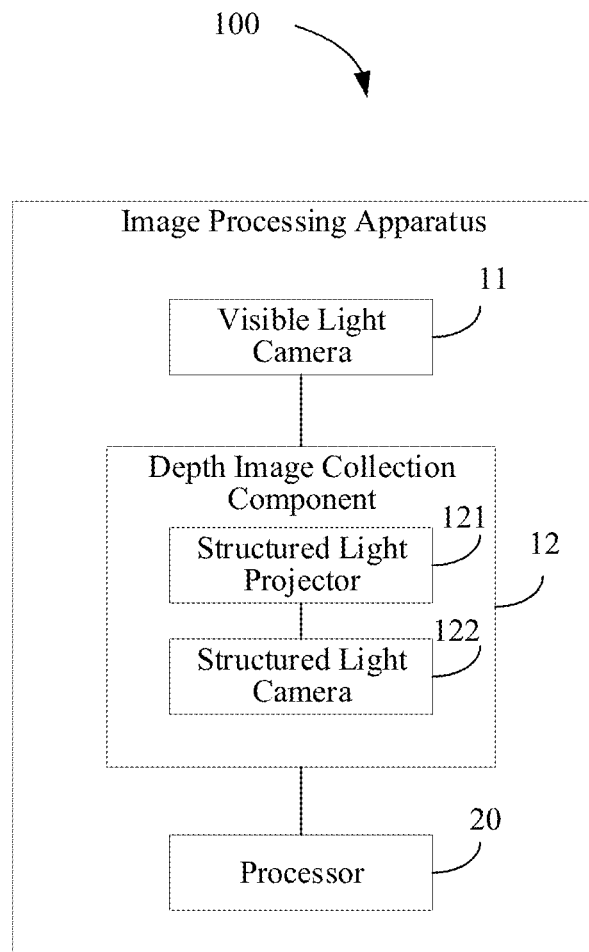
FIG. 1 is a schematic flowchart illustrating an image processing method according to embodiments of the present disclosure.
FIG. 2 is a schematic block diagram illustrating an image processing apparatus according to embodiments of the present disclosure.

FIG. 1 is a schematic flowchart illustrating an image processing method according to some implementations of the present disclosure. As illustrated in FIG. 1, the method may include the following.

At block 101, a background image and a portrait region image of a current user are acquired. A preset parameter of the background image matches the preset parameter of the portrait region image.

At block 102, the portrait region image and the background image are merged to obtain a merged image.

Figure 3:
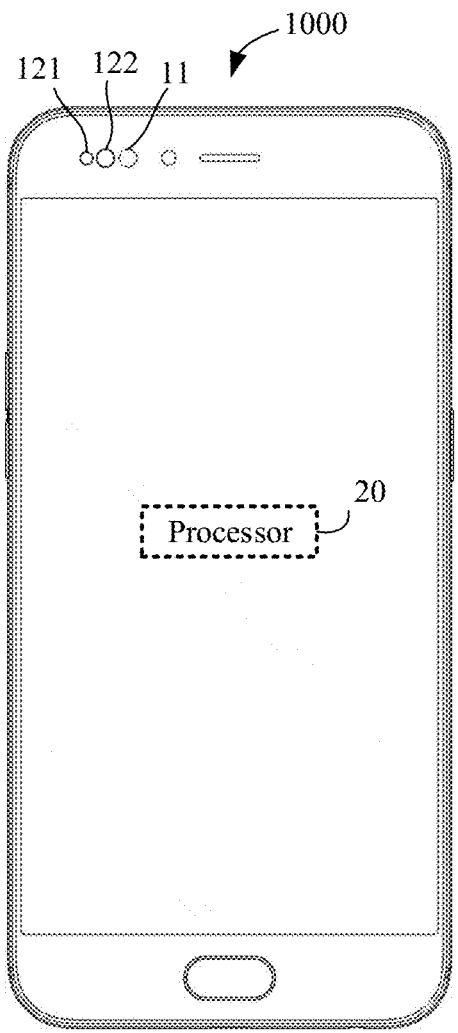
FIG. 3 is a schematic block diagram illustrating an electronic device according to embodiments of the present disclosure.

As illustrated in FIGS. 2 and 3, the image processing method according to implementations of the present disclosure may be implemented by an image processing apparatus 100 according to implementations of the present disclosure. The image processing apparatus 100 according to implementations of the present disclosure is integrated in an electronic device 1000. As illustrated in FIG. 2, the image processing apparatus 100 may include a visible light camera 11, a depth image collection component 12 and a processor 20. The block 101 may be implemented by the visible light camera 11 and the depth image collection component 12, and the block 102 may be implemented by the processor 20.

In other words, the visible light camera 11 and the depth image collection component 12 may be configured to acquire the background image and the portrait region image of the current user having the preset parameter matching the preset parameter of the background image. The processor 20 may be configured to merge the portrait region image and the background image to obtain the merged image.

The image processing apparatus 100 according to implementations of the present disclosure may be integrated in the electronic device 1000 according to implementations of the present disclosure. That is, the electronic device 1000 according to implementations of the present disclosure includes the image processing apparatus 100 according to implementations of the present disclosure.

In some implementations, the electronic device 1000 may include a phone, a tablet computer, a notebook computer, a smart bracelet, a smart watch, a smart helmet, smart glasses, and the like.

With the image processing method according to embodiments of the present disclosure, the background image and the portrait region image of the current user that the preset parameter of the background image matches the preset parameter of the portrait region image are acquired and the portrait region image and the background image are merged to obtain the merged image. Therefore, since the preset parameter of the background image matches the preset parameter of the portrait region image, the portrait region image and the background image may be naturally merged, thereby improving visual effect of image processing.

Figure 4:
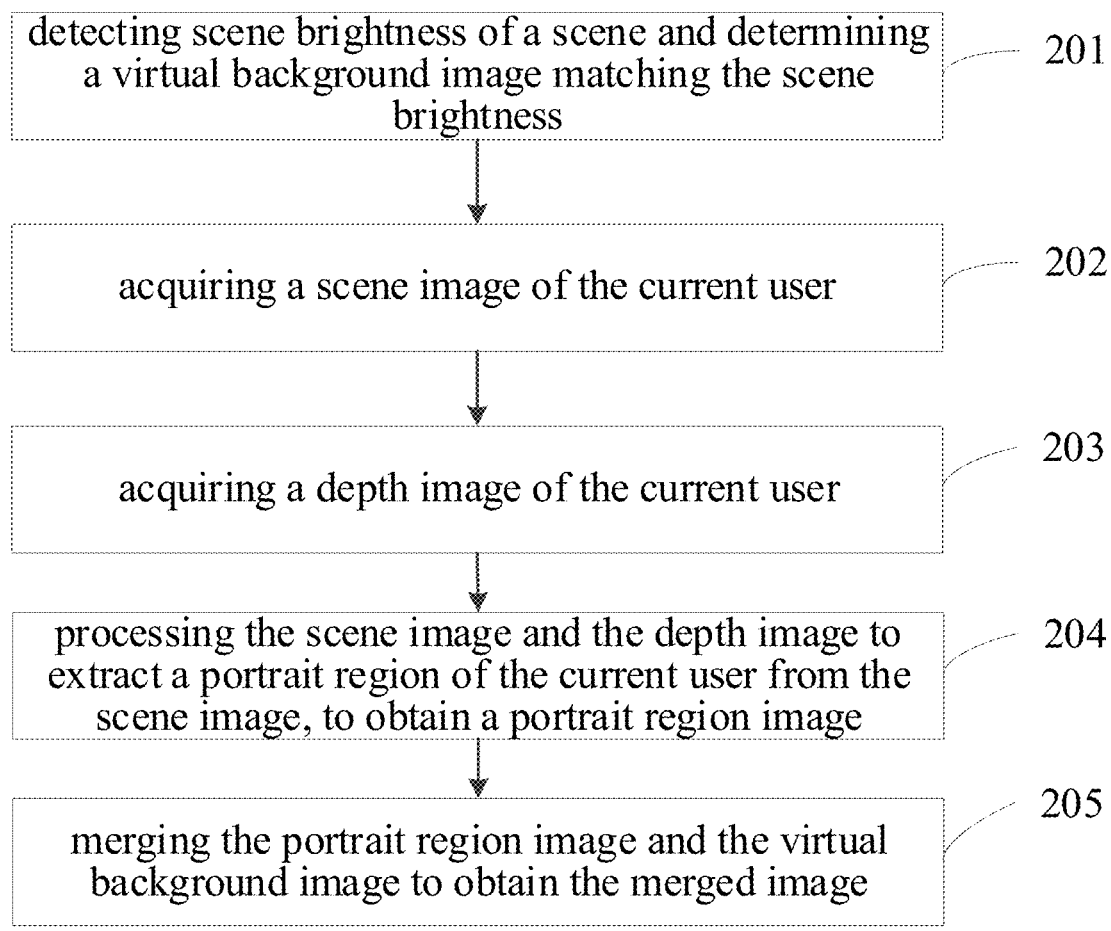
FIG. 4 is a schematic flowchart illustrating an image processing method according to embodiments of the present disclosure.

As illustrated in FIG. 4, in some implementations, the preset parameter may include brightness, and the block 101 may include the following.

At block 201, scene brightness of a scene is detected and a virtual background image matching the scene brightness is acquired.

At block 202, a scene image of the current user is acquired.

At block 203, a depth image of the current user is acquired.

At block 204, the scene image and the depth image are processed to extract a portrait region of the current user from the scene image, to obtain the portrait region image.

The block 102 may include a block 205.

At block 205, the portrait region image and the virtual background image are merged to obtain the merged image.

An existing method of separating a portrait and a background is mainly to separate the portrait and the background based on similarity and discontinuity of neighboring pixels in pixel values. This method is susceptible to environmental factors such as ambient luminance. The image processing method, the image processing apparatus 100 and the electronic device 1000 according to implementations of the present disclosure may obtain the depth image of the current user to extract the portrait region from the scene image. Since acquisition of the depth image is insusceptible to factors such as luminance or color distribution in the scene, the portrait region extracted from the depth image may be more accurate, Particularly, boundaries of the portrait region may be accurately marked. Further, the merged image obtained by merging the accurate portrait region and a preset virtual background may present a better effect.

In an embodiment of the present disclosure, it is desired to hide a current background while the current user is in a video chat with another. In this case, with the image processing method according to implementations of the present disclosure, the portrait region image corresponding to the current user and the preset virtual background may be merged. In addition, in order to merge the portrait region image to be merged and the preset virtual background, the scene brightness is detected to obtain the virtual background image matching the scene brightness, such that the brightness of the virtual background image matches the scene brightness, and the merged image is displayed to a target user. Since the current user is in the video chat with another, the visible light camera 11 needs to capture the scene image of the current user in real time, the depth image collection component 12 needs to capture the depth image corresponding to the current user in real time, and the processor 20 needs to timely process the scene image and the depth image captured in real time, to enable the another to view a smooth video composed of different merged images.

In conclusion, with the image processing method according to implementations of the present disclosure, the scene brightness of the scene is detected. The virtual background image matching the scene brightness is obtained. The scene image of the current user is obtained. The depth image of the current user is obtained. The scene image and the depth image are processed to extract the portrait region of the current user from the scene image, to obtain the portrait region image. The portrait region image and the virtual background image are merged to obtain the merged image. Therefore, the virtual background image matching the scene brightness is selected based on the scene brightness, to reduce a great difference between the scene brightness and the brightness of the virtual background image, such that the portrait region image and the virtual background image may be naturally merged, thereby improving the visual effect of image processing.

Figure 5:
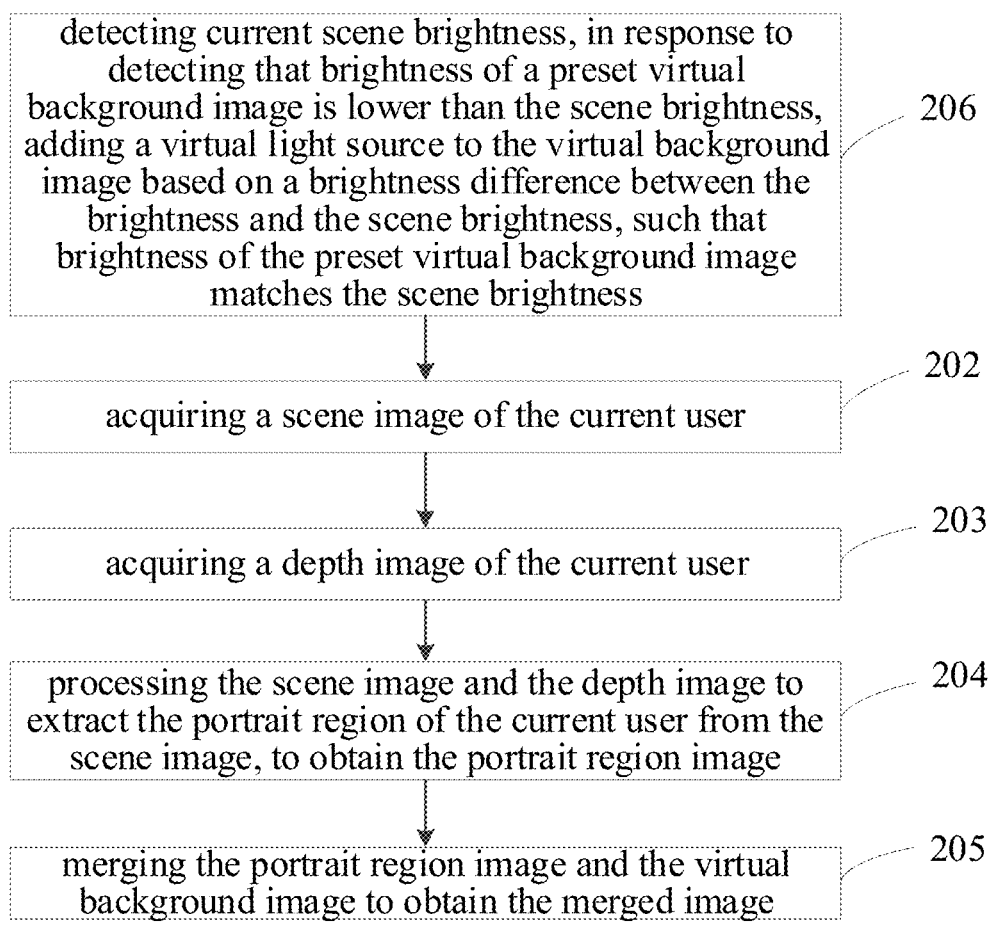
FIG. 5 is a schematic flowchart illustrating an image processing method according to embodiments of the present disclosure.

As illustrated in FIG. 5, in some implementations, the preset parameter may include the brightness, and the block 101 may include the following.

At block 206, current scene brightness of a scene is detected, and in response to detecting that brightness of a preset virtual background image is lower than the scene brightness, a virtual light source is added to the virtual background image based on a brightness difference between the brightness and the scene brightness, such that brightness of the virtual background image matches the scene brightness.

At block 202, a scene image of the current user is acquired.

At block 203, a depth image of the current user is acquired.

At block 204, the scene image and the depth image are processed to extract the portrait region of the current user from the scene image, to obtain the portrait region image.

The block 102 may include a block 205.

At block 205, the portrait region image and the virtual background image are merged to obtain the merged image.

The blocks 206 and 202 may be implemented by the visible light camera 11, the block 203 may be implemented by the depth image collection component 12, and the blocks 204 and 205 may be implemented by the processor 20.

In other words, the visible light camera 11 may be configured to detect the current scene brightness of the scene, and in response to detecting that the brightness of the preset virtual background image is lower than the scene brightness, to add the virtual light source to the virtual background image based on the brightness difference between the brightness of the preset virtual background image and the scene brightness, such that brightness of the virtual background image matches the scene brightness. In addition, the visible light camera 11 may be configured to acquire the scene image of the current user. The depth image collection component 12 may be configured to acquire the depth image of the current user. The processor 20 may be configured to process the scene image and the depth image to extract the portrait region of the current user from the scene image, to obtain the portrait region image; and to merge the portrait region image and the virtual background image to obtain the merged image.

In order to merge the portrait region image to be merged and the preset virtual background, a virtual light source may be added to the virtual background image, such that brightness of the virtual background image matches the scene brightness, and the merged image is displayed to the target user. Since the current user is in the video chat with another, the visible light camera 11 needs to capture the scene image of the current user in real time, the depth image collection component 12 needs to capture the depth image corresponding to the current user in real time, and the processor 20 needs to timely process the scene image and the depth image captured in real time to enable the another to view a smooth video composed of different merged images.

In conclusion, with the image processing method according to implementations of the present disclosure, the current scene brightness of the scene is detected. In response to detecting that the brightness of the preset virtual background image is lower than the scene brightness, the virtual light source is added to the virtual background image based on the brightness difference between the brightness of the preset virtual background image and the scene brightness, such that the brightness of the virtual background image matches the scene brightness. The scene image of the current user is acquired. The depth image of the current user is acquired. The scene image and the depth image are processed to extract the portrait region of the current user from the scene image, to obtain the portrait region image. The portrait region image and the virtual background image are merged to obtain the merged image. Therefore, A light source is added to the virtual background image based on the difference between the brightness of the virtual background and the scene brightness, to reduce a great difference between the scene brightness and the brightness of the virtual background image, such that the portrait region image and the virtual background image may be naturally merged, thereby improving the visual effect of image processing.

Figure 6:
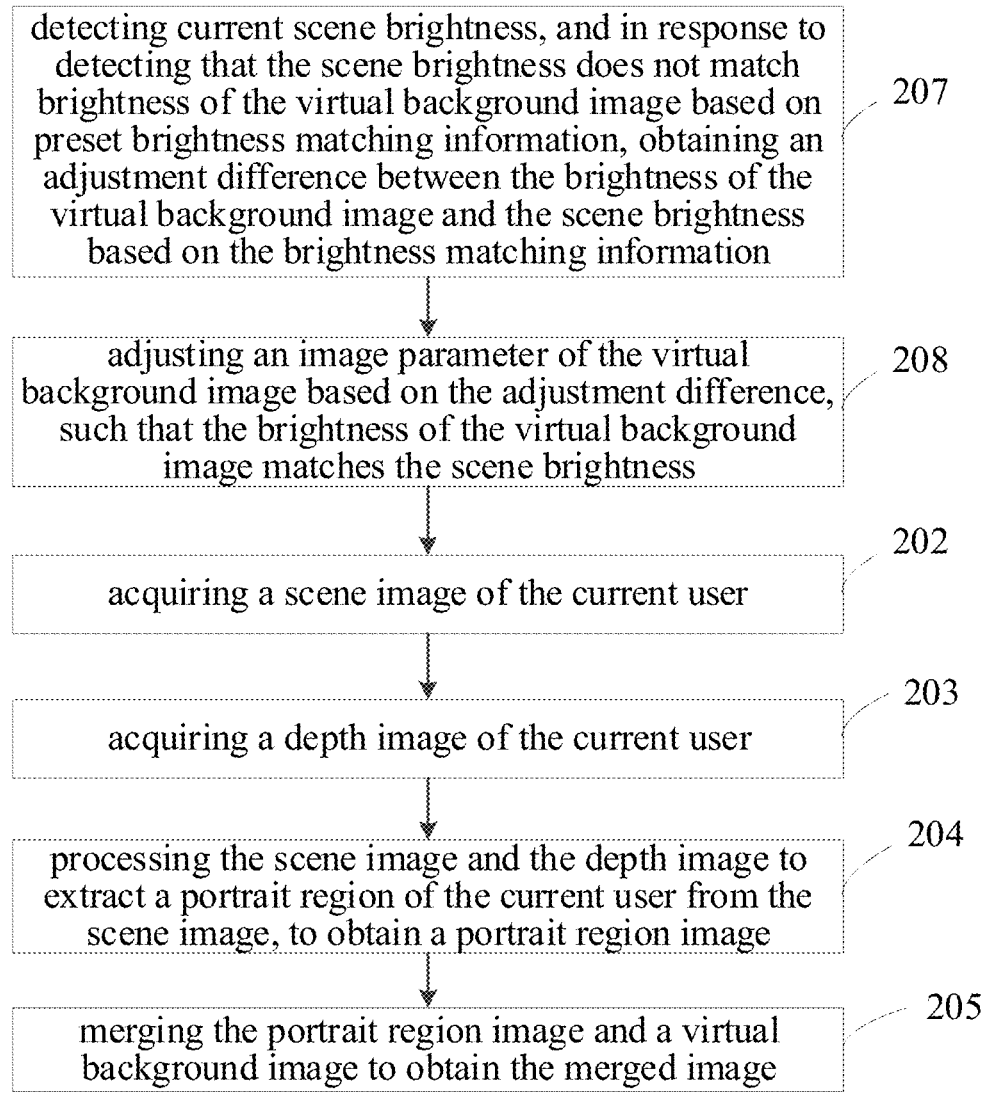
FIG. 6 is a schematic flowchart illustrating an image processing method according to embodiments of the present disclosure.

As illustrated FIG. 6, in some implementations, the preset parameter may include the brightness, and the block 101 may include the following.

At block 207, current scene brightness of the scene is detected, and in response to detecting that the scene brightness does not match brightness of the virtual background image based on preset brightness matching information, an adjustment difference between the brightness of the virtual background image and the scene brightness is obtained based on the brightness matching information.

At block 208, an image parameter of the virtual background image is adjusted based on the adjustment difference, such that the brightness of the virtual background image matches the current scene brightness.

At block 202, a scene image of the current user is acquired.

At block 203, a depth image of the current user is acquired.

At block 204, the scene image and the depth image are processed to extract the portrait region of the current user from the scene image, to obtain the portrait region image.

The block 102 may include a block 205.

At block 205, the portrait region image and the virtual background image are merged to obtain the merged image.

The blocks 207, 208 and 202 may be implemented by the visible light camera 11, the block 203 may be implemented by the depth image collection component 12, and the blocks 204 and 205 may be implemented by the processor 20.

In other words, the visible light camera 11 may be configured to detect the current scene brightness of the scene, and in response to detecting that the scene brightness does not match brightness of the virtual background image based on the preset brightness matching information, to obtain the adjustment difference between the brightness of the virtual background image and the scene brightness based on the brightness matching information; to adjust the image parameter of the virtual background image based on the adjustment difference, such that the brightness of the virtual background image matches the scene brightness. In addition, the visible light camera 11 may be configured to acquire the scene image of the current user. The depth image collection component 12 may be configured to acquire the depth image of the current user. The processor 20 may be configured to process the scene image and the depth image to extract the portrait region of the current user from the scene image, to obtain the portrait region image; and to merge the portrait region image and the virtual background image to obtain the merged image.

In order to merge the portrait region image to be merged and the preset virtual background, the current scene brightness of the scene is detected, in response to detecting that the scene brightness does not match the brightness of the virtual background image based on the preset brightness matching information, the adjustment difference between the brightness of the virtual background image and the scene brightness is obtained based on the brightness matching information, the image parameter of the virtual background image is adjusted based on the adjustment difference, such that the brightness of the virtual background image matches the scene brightness, and the merged image is displayed to the target user. Since the current user is in the video chat with the another, the visible light camera 11 needs to capture the scene image of the current user in real time, the depth image collection component 12 needs to capture the depth image corresponding to the current user in real time, and the processor 20 needs to timely process the scene image and the depth image captured in real time to enable the another to view a smooth video composed of different merged images.

In conclusion, with the image processing method according to embodiments of the present disclosure, the current scene brightness of the scene is detected. In response to detecting that the scene brightness does not match the brightness of the virtual background image based on the preset brightness matching information, the adjustment difference between the brightness of the virtual background image and the scene brightness is obtained based on the brightness matching information. The image parameter of the virtual background image is adjusted based on the adjustment difference, such that the brightness of the virtual background image matches the scene brightness. The scene image of the current user is acquired. The depth image of the current user is acquired. The scene image and the depth image are processed to extract the portrait region of the current user from the scene image, to obtain the portrait region image. The portrait region image and the virtual background image are merged to obtain the merged image. Therefore, the brightness of the virtual background image is adjusted based on the difference between the brightness of the virtual background and the current scene brightness to reduce a great difference between the scene brightness and the brightness of the virtual background image, such that the portrait region image and the virtual background image may be naturally merged, thereby improving the visual effect of image processing.

Figure 7:
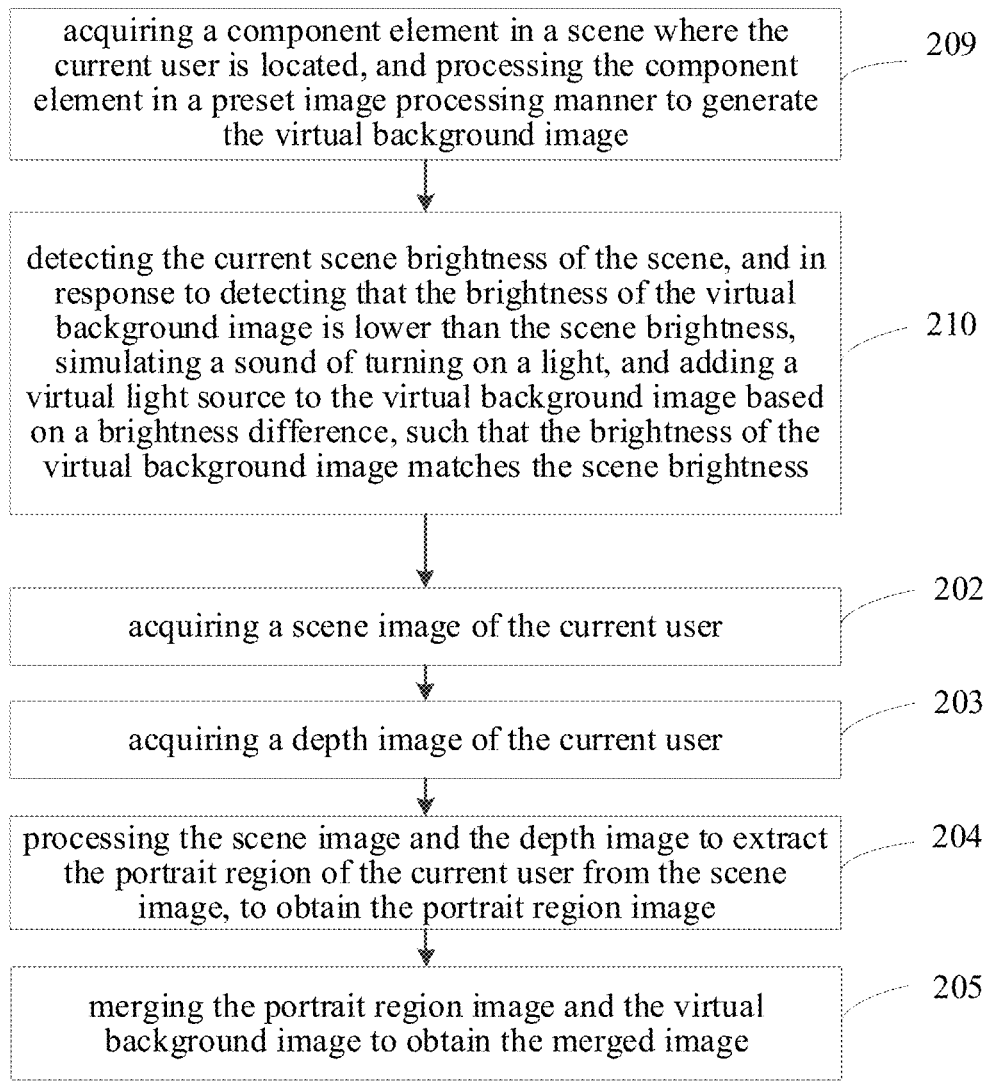
FIG. 7 is a schematic flowchart illustrating an image processing method according to embodiments of the present disclosure.

As illustrated in FIG. 7, in some implementations, the preset parameter may include the brightness, and the block 101 may include the following.

At block 209, a component element in a scene where the current user is located is acquired, and the component element is processed in a preset image processing manner to generate the virtual background image.

At block 210, the current scene brightness of the scene is detected, and in response to detecting that the brightness of the virtual background image is lower than the scene brightness, a sound of turning on a light is simulated and the virtual light source is added to the virtual background image based on a brightness difference between the scene brightness and the brightness of the virtual background image, such that the brightness of the virtual background image matches the scene brightness.

At block 202, a scene image of the current user is acquired.

At block 203, a depth image of the current user is acquired.

At block 204, the scene image and the depth image are processed to extract the portrait region of the current user from the scene image, to obtain the portrait region image.

The block 102 may include a block 205.

At block 205, the portrait region image and the virtual background image are merged to obtain the merged image.

The blocks 209, 210 and 202 may be implemented by the visible light camera 11, the block 203 may be implemented by the depth image collection component 12, and the blocks 204 and 205 may be implemented by the processor 20.

In other words, the visible light camera 11 may be configured to detect the current scene brightness of the scene, and in response to detecting that the brightness of the preset virtual background image is lower than the scene brightness, to simulate the sound of turning on a light through a related device, such as a loudspeaker, and to add the virtual light source to the virtual background image based on the brightness difference between the scene brightness and the brightness of the virtual background image, such that the brightness of the virtual background image matches the current scene brightness. In addition, the visible light camera may be configured to acquire the scene image of the current user. The depth image collection component 12 may be configured to acquire the depth image of the current user. The processor 20 may be configured to process the scene image and the depth image to extract the portrait region of the current user from the scene image, to obtain the portrait region image; and to merge the portrait region image and the virtual background image to obtain the merged image.

In order to merge the portrait region image to be merged and the preset virtual background, the virtual light source is added to the virtual background image and the sound of turning on a light is simulated for improving interactions with the user, such that the brightness of the virtual background image matches the scene brightness, and the merged image is displayed to the target user. Since the current user is in the video chat with the another, the visible light camera 11 needs to capture the scene image of the current user in real time, the depth image collection component 12 needs to capture the depth image corresponding to the current user in real time, and the processor 20 needs to timely process the scene image and the depth image captured in real time to enable the another to view a smooth video composed of different merged images.

In conclusion, with the image processing method according to implementations of the present disclosure, the component element in the scene where the current user is located may be acquired. The component element may be processed in the preset image processing manner to generate the virtual background image. The current scene brightness of the scene may be detected. In response to detecting that brightness of the virtual background image is lower than the scene brightness, the sound of turning on the light is simulated and the virtual light source is added to the virtual background image based on the brightness difference between the scene brightness and the brightness of the virtual background image, such that the brightness of the virtual background image matches the scene brightness. The scene image of the current user is acquired. The depth image of the current user is acquired. The scene image and the depth image are processed to extract the portrait region of the current user from the scene image, to obtain the portrait region image. The portrait region image and the virtual background image are merged to obtain the merged image. Therefore, a light source is added to the virtual background image based on the difference between the brightness of the virtual background and the scene brightness to reduce a great difference between the scene brightness and the brightness of the virtual background image, such that the portrait region image and the virtual background image may be naturally merged, thereby improving the visual effect of image processing. In addition, simulating the sound of turning on a light while adding the light source may increase reality of adding the light source, thereby realizing to interact with the user.

Figure 8:
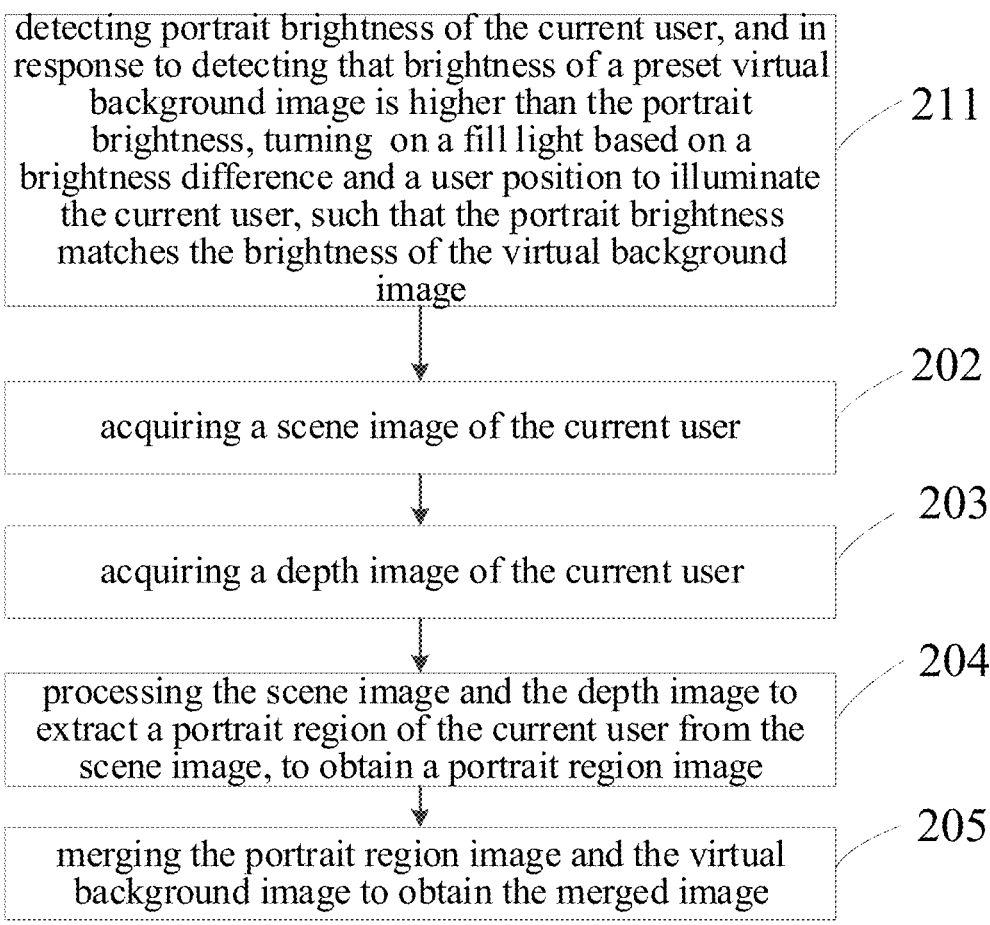
FIG. 8 is a schematic flowchart illustrating an image processing method according to embodiments of the present disclosure.

As illustrated FIG. 8, in some implementations, the preset parameter may include the brightness, and the block 101 may include the following.

At block 211, portrait brightness of the current user is detected, and in response to detecting that brightness of the preset virtual background image is higher than the portrait brightness, a fill light is turned on based on a brightness difference between the portrait brightness and the brightness of the preset virtual background image and a user position of the user, to illuminate the current user, such that the portrait brightness matches the brightness of the virtual background image.

At block 202, a scene image of the current user is acquired.

At block 203, a depth image of the current user is acquired.

At block 204, the scene image and the depth image are processed to extract the portrait region of the current user from the scene image, to obtain the portrait region image.

The block 102 may include a block 205.

At block 205, the portrait region image and the virtual background image are merged to obtain the merged image.

The blocks 211 and 202 may be implemented by the visible light camera 11, the block 203 may be implemented by the depth image collection component 12, and the blocks 204 and 205 may be implemented by the processor 20.

In other words, the visible light camera 11 may be configured to detect the portrait brightness of the current user, and in response to detecting that the brightness of the preset virtual background image is higher than the portrait brightness, to turn on the fill light based on the brightness difference between the portrait brightness and the brightness of the preset virtual background image and the user position of the user, to illuminate the current user, such that the portrait brightness matches the brightness of the virtual background image. In addition, the visible light camera 11 may be configured to acquire the scene image of the current user. The depth image collection component 12 may be configured to acquire the depth image of the current user. The processor 20 may be configured to process the scene image and the depth image to extract the portrait region of the current user from the scene image, to obtain the portrait region image; and to merge the portrait region image and the virtual background image to obtain the merged image.

In order to merge the portrait region image to be merged and the preset virtual background, a fill light is turned on to illuminate the current user in the scene, such that the brightness of the virtual background image matches the portrait brightness in the scene, and the merged image is displayed to the target user. Since the current user is in the video chat with the another, the visible light camera 11 needs to capture the scene image of the current user in real time, the depth image collection component 12 needs to capture the depth image corresponding to the current user in real time, and the processor 20 needs to timely process the scene image and the depth image captured in real time to enable the another to view a smooth video composed of different merged images.

In conclusion, with the image processing method according to implementations of the present disclosure. the portrait brightness of the current user is detected. In response to detecting that the brightness of the preset virtual background image is higher than the portrait brightness, the fill light is turned on based on the brightness difference between the portrait brightness and the brightness of the preset virtual background image and the user position of the user, to illuminate the current user, such that the portrait brightness matches the brightness of the virtual background image. The scene image of the current user is acquired. The depth image of the current user is acquired. The scene image and the depth image are processed to extract the portrait region of the current user from the scene image, to obtain the portrait region image. The portrait region image and the virtual background image are merged to obtain the merged image. Therefore, the fill light is turned on to illuminate the current user based on the difference between the brightness of the virtual background and the portrait brightness in the scene, to reduce a great difference between the portrait brightness in the scene and the brightness of the virtual background image, such that the portrait region image and the virtual background image may be naturally merged, thereby improving the visual effect of image processing.

Figure 9:
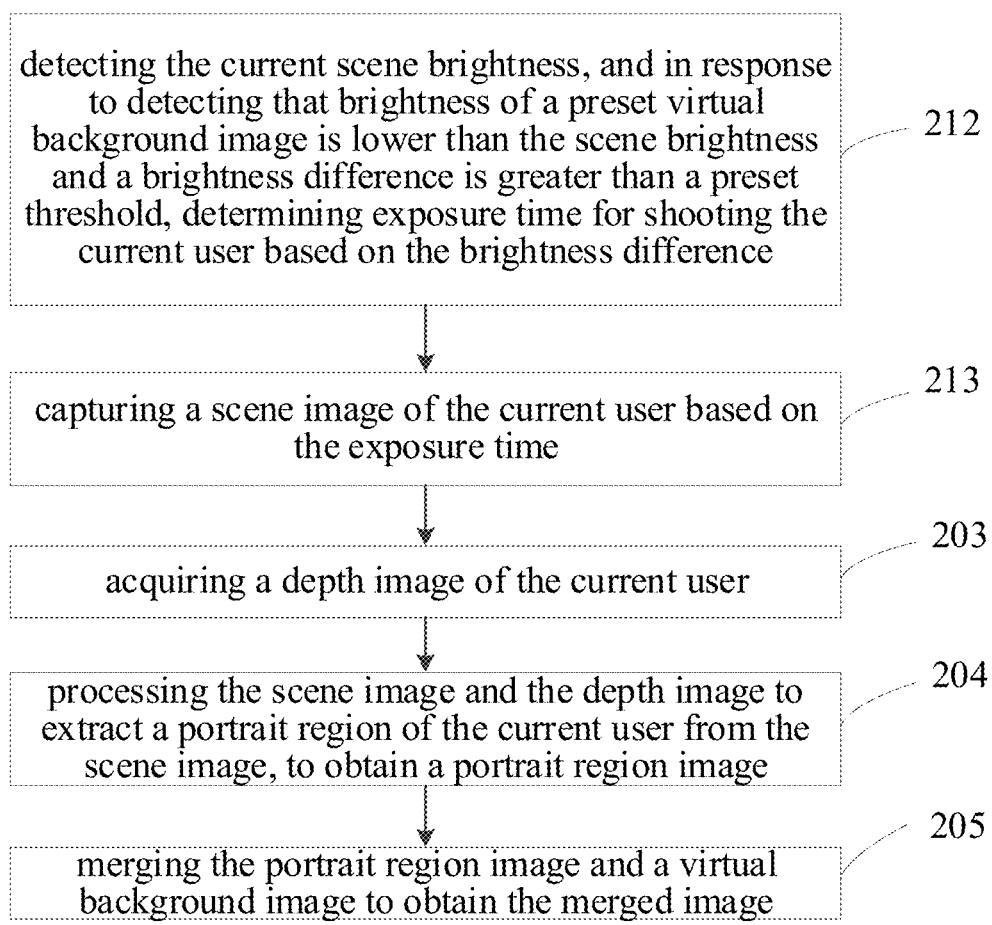
FIG. 9 is a schematic flowchart illustrating an image processing method according to embodiments of the present disclosure.

As illustrated FIG. 9, in some implementations, the preset parameter may include the brightness, and the block 101 may include the following.

At block 212, current scene brightness of the scene is detected, and in response to detecting that brightness of the preset virtual background image is lower than the scene brightness and a brightness difference between the brightness of the preset virtual background image and the scene brightness is greater than a preset threshold, exposure time for shooting the current user is determined based on the brightness difference.

At block 213, a scene image of the current user is captured based on the exposure time.

At block 203, a depth image of the current user is acquired.

At block 204, the scene image and the depth image are processed to extract the portrait region of the current user from the scene image, to obtain the portrait region image.

The block 102 may include a block 205.

At block 205, the portrait region image and the virtual background image are merged to obtain the merged image.

The blocks 212 and 213 may be implemented by the visible light camera 11, the block 203 may be implemented by the depth image collection component 12, and the blocks 204 and 205 may be implemented by the processor 20.

In other words, the visible light camera 11 may be configured to capture the scene image of the current user based on the exposure time. The depth image collection component 12 may be configured to acquire the depth image of the current user. The processor 20 may be configured to process the scene image and the depth image to extract the portrait region of the current user from the scene image, to obtain the portrait region image; and to merge the portrait region image and the virtual background image to obtain the merged image.

In the merged image, as the portrait region image is obtained by exposing to light based on the brightness difference from the virtual background image, the merged image in the embodiment of the present disclosure may be more natural thereby providing better visual effect to the user.

In conclusion, with the image processing method according to embodiments of the present disclosure, the current scene brightness of the scene is detected. In response to detecting that the brightness of the preset virtual background image is lower than the scene brightness and the brightness difference between the brightness of the preset virtual background image and the scene brightness is greater than the preset threshold, the exposure time for shooting the current user is determined based on the brightness difference. The scene image of the current user is acquired based on the exposure time. The depth image of the current user is acquired. In addition, the scene image and the depth image are processed to extract the portrait region of the current user from the scene image, to obtain the portrait region image, and the portrait region image and the virtual background image are merged to obtain the merged image. Therefore, the exposure time for shooting the current user is controlled based on the brightness difference between the brightness of the virtual background and the scene brightness to reduce a great difference between the scene brightness and the brightness of the virtual background image, such that the portrait region image and the virtual background image may be naturally merged, thereby improving the visual effect of image processing.

Figure 10:
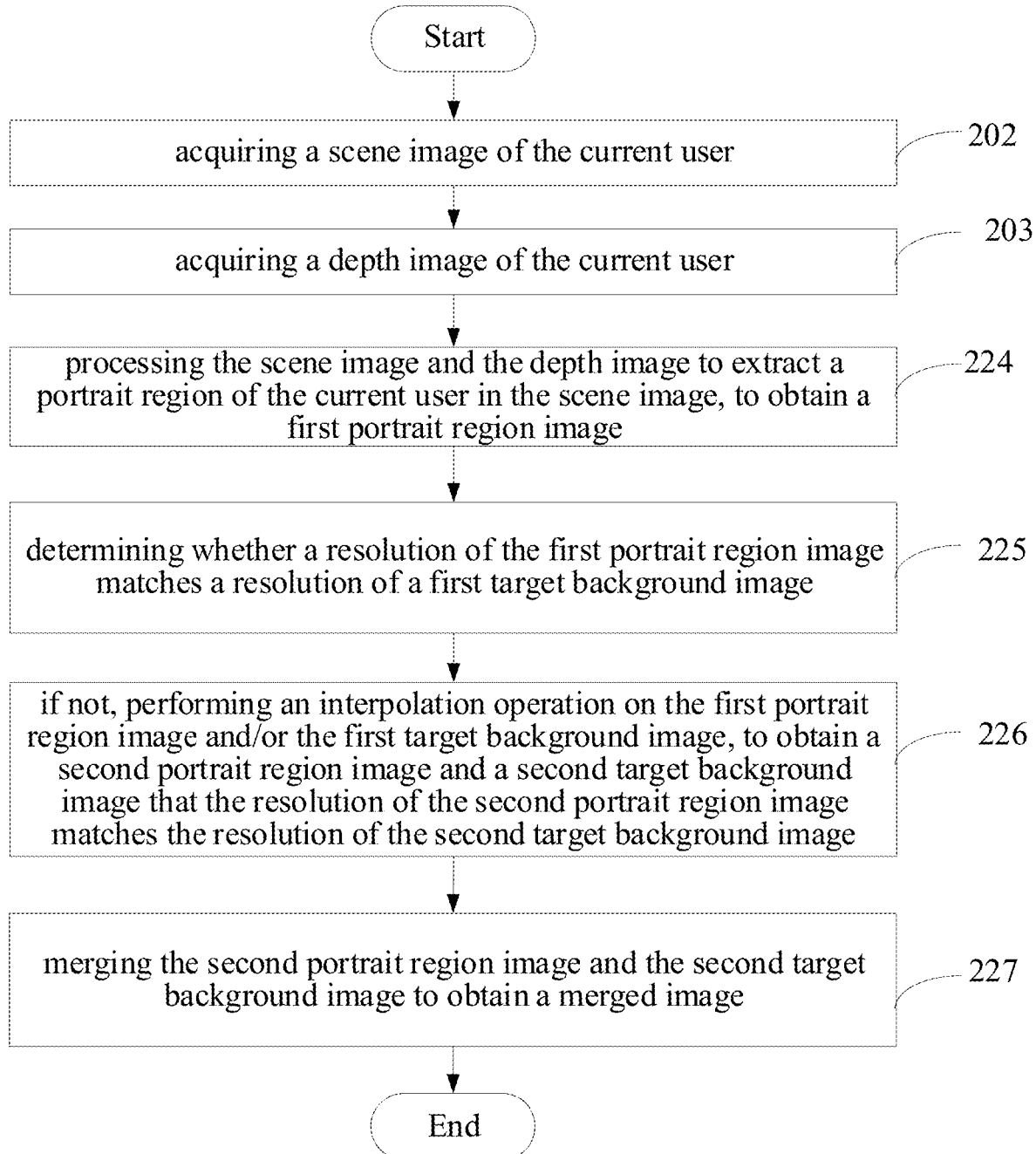
FIG. 10 is a schematic flowchart illustrating an image processing method according to embodiments of the present disclosure.

As illustrated in FIG. 10, in some implementations, the preset parameter may include a resolution, and the block 101 may include the following.

At block 202, a scene image of the current user is acquired.

At block 203, a depth image of the current user is acquired.

At block 224, the scene image and the depth image are processed to extract the portrait region of the current user in the scene image, to obtain a first portrait region image.

At block 225, it is determined whether the resolution of the first portrait region image matches the resolution of a first target background image.

At block 226, in response to determining that the resolution of the first portrait region image does not match the resolution of the first target background image, interpolation processing is performed on the first portrait region image and/or the first target background image, to obtain a second portrait region image and a second target background image, the resolution of the second portrait region image matches the resolution of the second target background image.

The block 102 may include a block 227.

At block 227, the second portrait region image and the second target background image are merged to obtain the merged image.

The block 202 may be implemented by the visible light camera 11, the block 203 may be implemented by the depth image collection component 12, and the blocks 224 to 227 may be implemented by the processor 20.

In other words, the visible light camera 11 may be configured to acquire the scene image of the current user. The depth image collection component 12 may be configured to acquire the depth image of the current user. The processor 20 may be configured to process the scene image and the depth image to extract the portrait region of the current user in the scene image, to obtain the first portrait region image; to determine whether the resolution of the first portrait region image matches the resolution of the first target background image; in response to determining that the resolution of the first portrait region image does not match the resolution of the first target background image, to perform the interpolation processing on the first portrait region image and/or the first target background image, to obtain the second portrait region image and the second target background image, the resolution of the second portrait region image matching the resolution of the second target background image; and to merge the second portrait region image and the second target background image to obtain the merged image.

It may be understood that, with an existing technology of merging the portrait and the virtual background, in the merged image obtained by merging the extracted portrait region image and the preset background image, a poor visual effect of the merged image, such as rough and unnatural merging effect may occur at a merging portion between the portrait region and the background region. It has been found that the above poor visual effect is usually caused by a difference between the resolution of the portrait region image and the resolution of the background region image.

Therefore, in embodiments of the present disclosure, after the portrait region of the current user is extracted in the scene image to obtain the first portrait region image based on the acquired scene image and the depth image of the current user, in order to improve the visual effect of the merged image, it may be determined whether the resolution of the scene image matches the resolution of the depth image before the first portrait region image and the first target background image are merged.

In a case that the resolution of the first portrait region image matches the resolution of the first target background image, the first portrait region image and the first target background image may be merged to obtain the merged image.

In a case that the resolution of the first portrait region image does not match the resolution of the first target background image, the interpolation processing may be performed on the first portrait region image and/or the first target background image to obtain the second portrait region image and the second target background image. The resolution of the second portrait region image matches the resolution of the second target background image. The second portrait region image and the second target background image are merged to obtain the merged image.

The first target background image may be selected by the processor 20 or may be selected by the current user based on demands. The first target background image may be a dynamic image or a still image, which is not limited herein.

In detail, a preset range of resolution differences may be set in advance according to requirements. In a case that the difference between the resolution of the first portrait region image and the resolution of the first target background image is within the preset range, it may be determined that the resolution of the first portrait region image matches the resolution of the first target background image.

It should be noted that the processor 20 may be configured to perform the interpolation processing on the first portrait region image only to obtain the second portrait region image. In this case, the second target background image is the first target background image that is not subjected to the interpolation processing. The processor 20 may be configured to perform the interpolation processing on the first target background image only to obtain the second target background image. In this case, the second portrait region image is the first portrait region image that is not subjected to the interpolation processing. The processor 20 is configured to perform the interpolation processing on both the first target background image and the first portrait region to obtain the second target background image and the second portrait region image respectively.

In addition, the merged image obtained after the merging may be displayed on a display screen of the electronic device 1000, or may be printed by a printer connected to the electronic device 1000.

In some application scenarios, for example, it is desired to hide a current background while the current user is in a video chat with another, with the image processing method according to implementations of the present disclosure, the portrait region image corresponding to the current user and the target background image having the resolution that matches the resolution of the portrait region image may be merged, and the merged image is displayed to the another. Since the current user is in the video chat with the another, the visible light camera 11 needs to capture the scene image of the current user in real time, the depth image collection component 12 needs to acquire the depth image corresponding to the current user in real time, and the processor 20 needs to timely process the scene image and the depth image captured in real time, to enable the another to view a smooth video composed of different merged images.

An existing method of separating a portrait and a background is mainly to separate the portrait and the background based on the similarity and discontinuity of neighboring pixels in pixel values. This method is susceptible to environmental factors such as ambient luminance. The image processing method, the image processing apparatus 100 and the electronic device 1000 according to implementations of the present disclosure, may obtain the depth image of the current user to extract the first portrait region from the scene image. Since acquisition of the depth image is insusceptible to factors such as luminance or color distribution in the scene, the first portrait region extracted from the depth image may be more accurate. Particularly, boundaries of the portrait region may be accurately marked. Further, the resolution of the first target background image and/or the resolution of the first portrait region image are processed respectively to obtain the second target background image and the second portrait region image that the resolution of the second target background image matches the resolution of the second portrait region image, and the second target background image and the second portrait region image are merged. In the merged image, the merging portion between the portrait region and the background region may be more natural and the effect of the merged image may be better.

Figure 11:
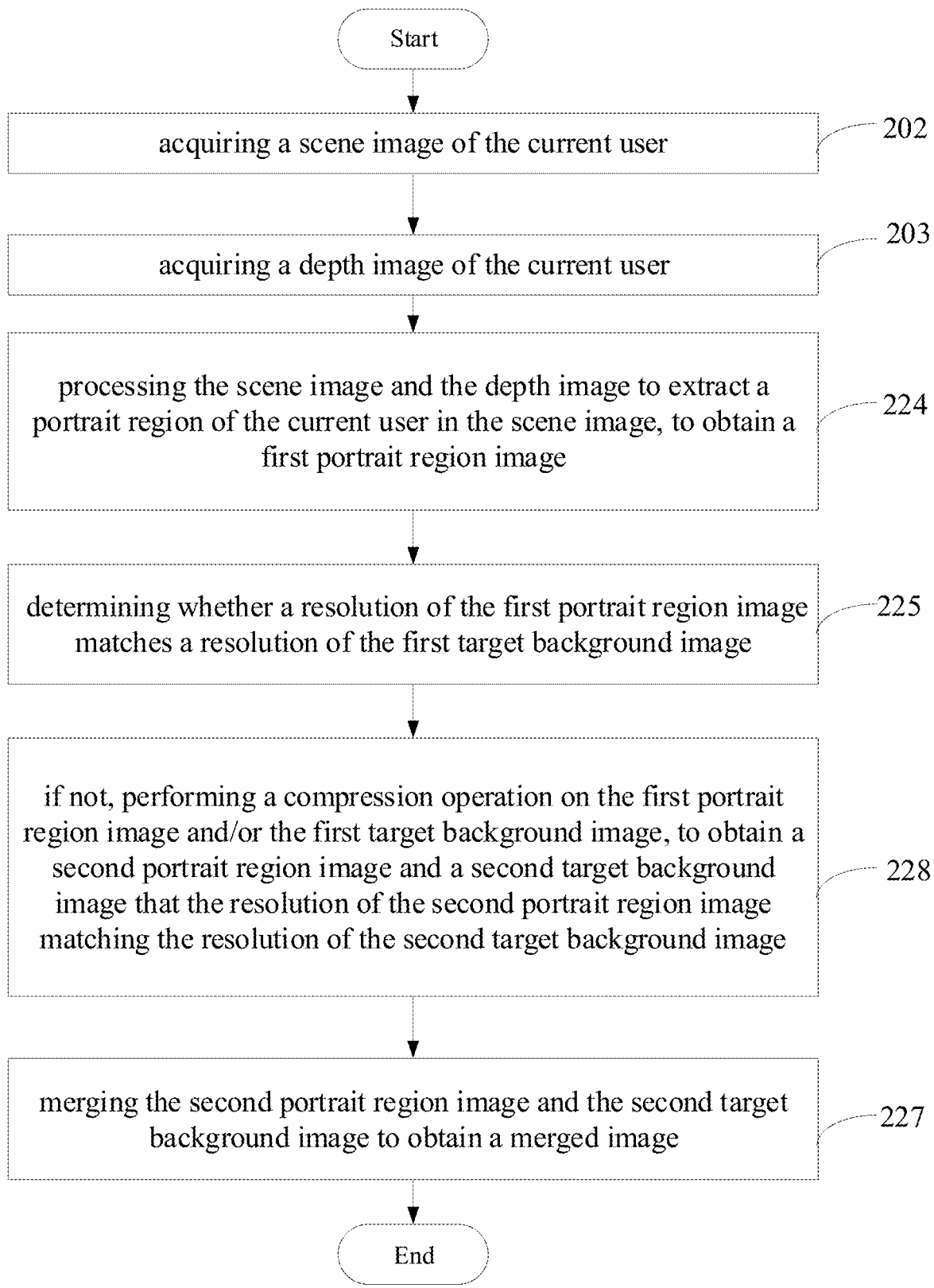
FIG. 11 is a schematic flowchart illustrating an image processing method according to embodiments of the present disclosure.

As illustrated FIG. 11, in some implementations, the preset parameter may include the resolution, and the block 101 may include the following.

At block 202, a scene image of the current user is acquired.

At block 203, a depth image of the current user is acquired.

At block 224, the scene image and the depth image are processed to extract the portrait region of the current user in the scene image, to obtain the first portrait region image.

At block 225, it is determined whether the resolution of the first portrait region image matches the resolution of the first target background image.

At block 228, in response to determining that the resolution of the first portrait region image does not match the resolution of the first target background image, compression processing is performed on the first portrait region image and/or the first target background image, to obtain the second portrait region image and the second target background image that the resolution of the second portrait region image matches the resolution of the second target background image.

The block 102 may include a block 227.

At block 227, the second portrait region image and the second target background image are merged to obtain the merged image.

The block 202 may be implemented by the visible light camera 11, the block 203 may be implemented by the depth image collection component 12, and the blocks 224, 225, 227 and 228 may be implemented by the processor 20.

In other words, the visible light camera 11 may be configured to acquire the scene image of the current user. The depth image collection component 12 may be configured to acquire the depth image of the current user. The processor 20 may be configured to process the scene image and the depth image to extract the portrait region of the current user in the scene image, to obtain the first portrait region image; to determine whether the resolution of the first portrait region image matches the resolution of the first target background image; in response to determining that the resolution of the first portrait region image does not match the resolution of the first target background image, to perform the compression processing on the first portrait region image and/or the first target background image, to obtain the second portrait region image and the second target background image that the resolution of the second portrait region image matches the resolution of the second target background image; and to merge the second portrait region image and the second target background image to obtain the merged image.

In a case that the resolution of the first portrait region image does not match the resolution of the first target background image, the compression processing may be performed on the first portrait region image and/or the first target background image to obtain the second portrait region image and the second target background image that the resolution of the second portrait region image matches the resolution of the second target background image. The second portrait region image and the second target background image are merged to obtain the merged image.

It should be noted that when the processor 20 may be configured to perform the compression processing on the first portrait region image only to obtain the second portrait region image. In this case, the second target background image is the first target background image that is not subjected to the compression processing. The processor 20 may be configured to perform the compression processing on the first target background image only to obtain the second target background image. In this case, the second portrait region image is the first portrait region image that is not subjected to the compression processing. The processor 20 may be configured to perform the compression processing on both the first target background image and the first portrait region to obtain the second target background image and the second portrait region image respectively.

At block 201, the scene brightness of the scene is detected and the virtual background image matching the scene brightness is acquired.

The virtual background image may be a two-dimensional virtual background image, or a three-dimensional virtual background image. In a case of the three-dimensional background image, the virtual background image may be obtained by modeling based on real scene information of the user, which is not limited here. To further improve the user's video experience, the virtual background image may be determined randomly based on a preset mode or determined based on a preference of the current user. For example, a virtual animation background image may be set for a user who prefers animation, and a virtual landscape painting background image may be set for a user who prefers landscape paintings. The virtual background image may be a two-dimensional virtual background image or a three-dimensional virtual background image, which is not limited herein.

It should be noted that, based on different application scenarios, the current scene brightness may be detected in different ways. For example, the current scene brightness may be detected by a brightness sensor.

It may be understood that, in an actual application, in a case that a great difference exists between the brightness of the preset virtual background image and the scene brightness, brightness characteristics of a face region of the current user is significantly different from that of the preset virtual background image. In this case, in order to realize a natural merging between the face region of the current user and the preset virtual background image in subsequent operations, the virtual background image having the brightness that matches the scene brightness may be selected based on the scene brightness.

It should be noted that, depending on the application scenario, different methods may be used to obtain the virtual background image matching the scene brightness. Examples may be illustrated as follows.

Figure 12:
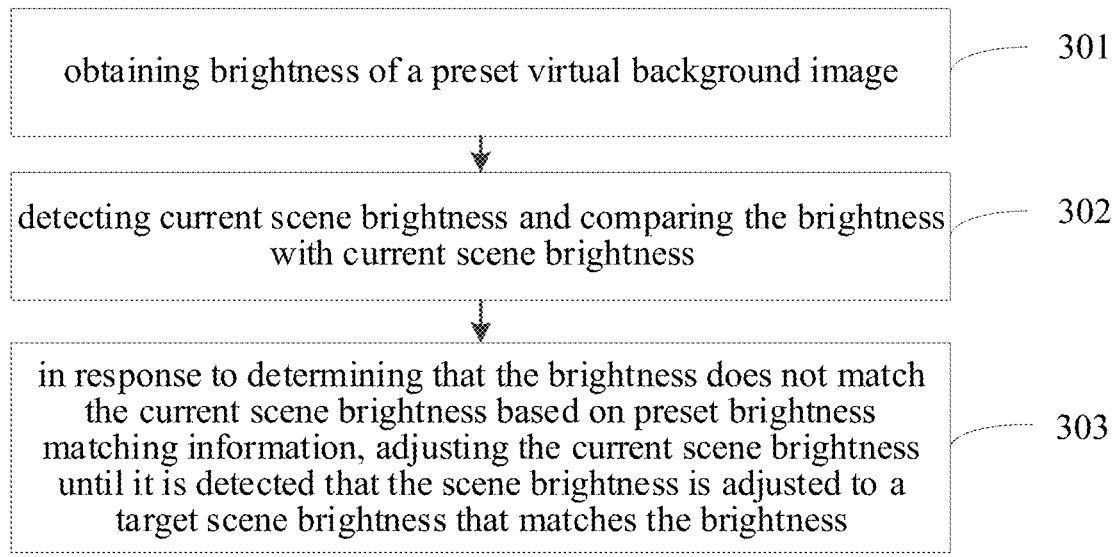
FIG. 12 is a schematic flowchart illustrating an image processing method according to embodiments of the present disclosure.

As a possible implementation, as illustrated in FIG. 12, the block 201 may include the following.

At block 301, image brightness of a preset virtual background image is obtained.

It should be noted that depending on different application scenarios, the image brightness of the preset virtual background image may be obtained in different ways. For example, an image brightness parameter of the virtual background may be extracted through image processing technology, and the brightness of the virtual background image may be calculated based on the image brightness parameter. As another example, the preset virtual background image may be input into a related measurement model to determine the brightness of the virtual background image based on outputs of the model.

At block 302, the current scene brightness is detected, and the image brightness is compared with the current scene brightness.

At block 303, in response to determining that the image brightness does not match the current scene brightness based on preset brightness matching information, the current scene brightness is adjusted until detecting that the scene brightness is adjusted to target scene brightness that matches the image brightness.

In detail, in this example, in response to determining that the image brightness does not match the current scene brightness based on the preset brightness matching information, the current scene brightness may be actively adjusted until it is detected that the scene brightness is adjusted to the target scene brightness matching the image brightness, such that the brightness of the virtual background image matches the brightness of an actual scene. For example, the scene brightness may be adjusted in a way of controlling an exposure time.

Figure 13:
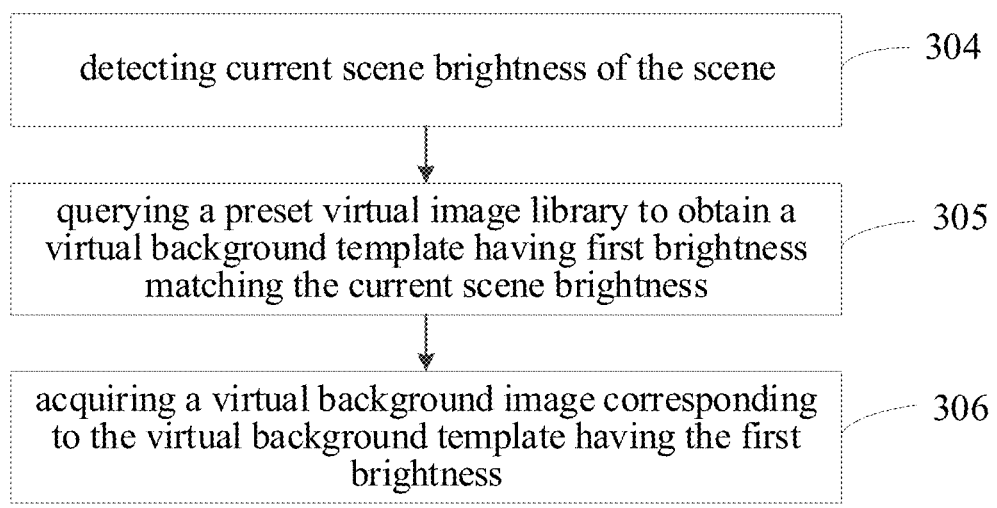
FIG. 13 is a schematic flowchart illustrating an image processing method according to embodiments of the present disclosure.

As another possible implementation, as illustrated FIG. 13, the block 201 may include the following.

At block 304, current scene brightness of the scene is detected.

At block 305, preset information of a virtual image library is queried to obtain a virtual background template having first brightness matching the current scene brightness.

At block 306, the virtual background image corresponding to the virtual background template having the first brightness is acquired.

In detail, in this example, image library information including virtual image libraries having various brightness may be set in advance. The image library may be queried based on the current scene brightness to obtain the virtual background template having the first brightness matching the current scene brightness. The brightness of the background template is substantially same to the scene brightness.

In an embodiment of the present disclosure, since the image library information includes limited virtual image libraries, in a case that the virtual background template matching the current scene brightness is not obtained, the virtual background template having a second brightness closest to the current scene brightness may be determined to adjust the current scene brightness until it is detected that the current scene brightness is adjusted to the target scene brightness corresponding to the virtual background template having the second brightness. The virtual background image corresponding to the virtual background template having the second brightness may be acquired.

Certainly, in this example, in a case that the virtual background template matching the current scene brightness is not obtained, on the basis of the current scene brightness, the virtual background image that matches the current scene brightness may also be directly generated.

The scene image may be a grayscale image or a color image. The depth image characterizes depth information including depth information of each person or object included in the scene of the current user. A scene range of the scene image is consistent with the scene range of the depth image, and each pixel in the scene image may have respective depth information corresponding to that pixel provided by the depth image.

At block 206, the current scene brightness of the scene is detected, and in response to detecting that the brightness of the preset virtual background image is lower than the current scene brightness, a virtual light source is added to the virtual background image based on a brightness difference between the brightness of the preset virtual background image and the current scene brightness, such that the brightness of the virtual background image matches the current scene brightness.

A type of the virtual light source may include one or a combination of: an area light, a spot light, a ball light and sunlight.

At block 207, the current scene brightness of the scene is detected, and in response to detecting that the current scene brightness does not match the brightness of the virtual background image based on the preset brightness matching information, an adjustment difference between the brightness of the virtual background image and the current scene brightness is obtained based on the brightness matching information.

At block 208, an image parameter of the virtual background image is adjusted based on the adjustment difference, such that the brightness of the virtual background image matches the current scene brightness.

It should be noted that, depending on the application scenario, the current scene brightness may be detected in different ways. For example, the current scene brightness may be detected by a brightness sensor. Similarly, depending on the application scenario, the brightness of the preset virtual background image may be obtained in different ways. For example, the image brightness parameter of the virtual background may be extracted through the image processing technology, and the brightness of the virtual background image may be calculated based on the image brightness parameter. As another example, the preset virtual background image may be input into a related measurement model to determine the brightness of the virtual background image based on outputs of the model.

It may be understood that, in an actual application, in a case that a great difference exists between the brightness of the preset virtual background image and the scene brightness, brightness characteristics of a face region of the current user is significantly different from that of the preset virtual background image. In this case, in order to realize a natural merging between the face region of the current user and the preset virtual background image in subsequent operations, the image parameter of the virtual background image may be adjusted such that the brightness of the virtual background image matches the scene brightness.

In detail, as a possible implementation, the current scene brightness of the scene may be detected. In response to detecting that the scene brightness does not match the brightness of the virtual background image based on the preset brightness matching information, the adjustment difference between the brightness of the virtual background image and the scene brightness may be obtained based on the brightness matching information. The image parameter of the virtual background image may be adjusted based on the adjustment difference, such that the brightness of the virtual background image matches the scene brightness.

It should be noted that, depending on the application scenario, the image parameter of the virtual background image may be adjusted in different ways based on the adjustment difference.

Examples may be described as follows.

As a possible implementation, brightness parameters of an HSV (hue, saturation, Value) color model of the virtual background image may be adjusted based on the adjustment difference. In detail, the HSV is a color space created based on intuitive characteristics of colors. The parameters in this model may be: hue (H), saturation (S) and Value (V). Therefore, in embodiments, the brightness of the face region may be increased by raising a parameter value of the Value in the HSV space. The Value of the face region increases the brightness of the face region.

Figure 14:
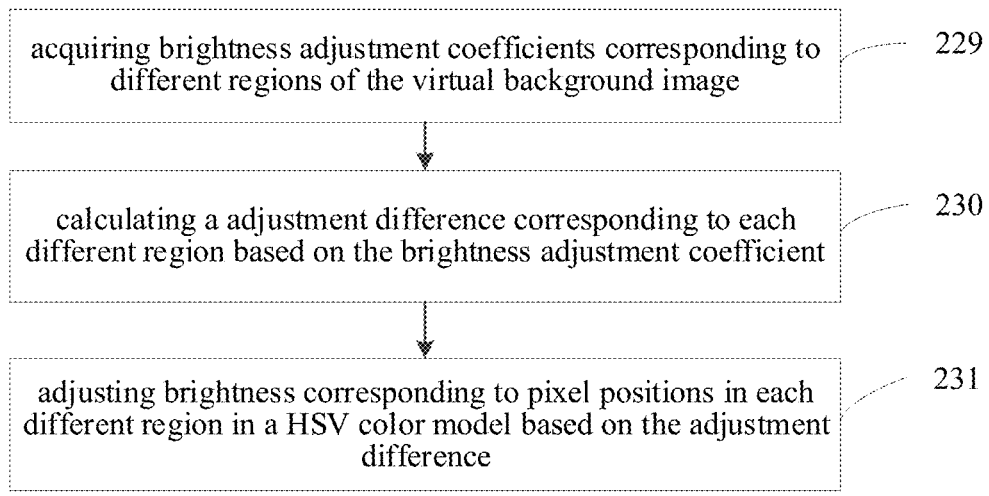
FIG. 14 is a schematic flowchart illustrating an image processing method according to embodiments of the present disclosure.

As illustrated in FIG. 14, the adjustment method in examples may include the following.

At block 229, brightness adjustment coefficients corresponding to different regions of the virtual background image are acquired.

At block 230, the adjustment difference corresponding to each region is calculated based on the brightness adjustment coefficient corresponding to different regions.

At block 231, brightness, in the HSV color module, corresponding to pixel positions in each region is adjusted based on the adjustment difference corresponding to each region.

It should be understood that the brightness adjustment coefficient in embodiments of the present disclosure corresponds to the parameter value of the Value in the HSV color model. The higher the parameter value of the Value, the higher the brightness of a corresponding region in the virtual background image. The greater the brightness difference between the scene and the virtual background image, the greater the adjustment difference, and the greater the brightness adjustment coefficient of the corresponding region in the virtual background image.

Therefore, the brightness adjustment coefficients corresponding to different regions of the virtual background image are acquired, the adjustment difference corresponding to each of the different regions is calculated based on the brightness adjustment coefficient corresponding to that region. Further, the brightness, in the HSV color model, corresponding to the pixel positions in each of the different regions is adjusted based on the adjustment difference corresponding to that region.

As another possible implementation, a preset parameter of a CCM (color correction matrix) model corresponding to the virtual background image is adjusted based on the adjustment difference.

In detail, in embodiments of the present disclosure, the brightness may be adjusted based on adjustments on parameters of the CCM model.

A calculation formula of the CCM model (color correction matrix) is represented by formula (1):

$$\begin{bmatrix} C00 & C01 & C02 \\ C10 & C11 & C12 \\ C20 & C21 & C22 \end{bmatrix} * \begin{bmatrix} r \\ g \\ b \end{bmatrix} = \begin{bmatrix} R \\ G \\ B \end{bmatrix} \quad \text{Formula (1)}$$

where, a pixel before performing the CCM is represented by $$\begin{bmatrix} r \\ g \\ b \end{bmatrix}$$

and the pixel after performing the CCM is represented by $$\begin{bmatrix} R \\ G \\ B \end{bmatrix}.$$

In other words, the implementation of CCM is based on a simple linear matrix. By adjusting R-G and B-G coefficients in the G channel, G-R and B-R coefficients in the R channel, and G-B and R-B coefficients in the B channel, a color correction may be realized to change brightness of the image. The CCM model does not change the white balance while performing the color correction because a gain of each channel of a camera device is adjusted based on conditions of the white balance. That is, when a white scene is shot, output amplitudes of the three channels of R, G and B should be equal to each other. In other words, the corrected three primary colors should be in the relationship of R=G=B. Based on this relationship, the coefficients in the above formula (1) may be as follows:

$$\begin{cases} C00 = 1 - C01 - C02 \\ C11 = 1 - C10 - C12 \\ C22 = 1 - C20 - C21 \end{cases}$$

Consequently, the pixel $$\begin{bmatrix} R \\ G \\ B \end{bmatrix}$$

after performing the CCM may be expressed as:

$$R = r + C01(g - r) + C02(b - r)$$
$$G = g + C10(r - g) + C12(b - g).$$
$$B = b + C20(r - b) - C21(g - b)$$

Based on the above correspondence, the RGB color allocation may be adjusted by changing values of parameters C00, C11 and C22 on a diagonal of the matrix of the CCM model, thereby adjusting the brightness.

In detail, in this example, the preset parameters C00, C11 and C22 of the CCM model corresponding to the virtual background image may be adjusted based on the adjustment difference. The greater the adjustment difference, the higher the adjustment on the parameter of the CCM model.

The scene image may be a grayscale image or a color image. The depth image characterizes depth information including the depth information of each person or object included in the scene of the current user. A scene range of the scene image is consistent with a scene range of the depth image, and each pixel in the scene image may have the depth information, corresponding to that pixel, provided by the depth image.

At block 209, a component element in the scene where the current user is located is acquired, and the component element is processed in a preset image processing manner to generate the virtual background image.

The component element in the scene may include items and environmental information of a real scene where the user is located. For example, for a conference room scene, the component element may include tables and chairs in the conference room, office supplies, windows and scenery outside the window.

In addition, the above-mentioned preset image processing method may be a conversion method set in advance for converting the scene into the virtual background image based on the component elements included in the scene where the user is located. The conversion method varies depending on the application scenario. As a possible implementation, a virtual image corresponding to the component elements in each scene may be set and saved in advance. The virtual image may be in an animation form or a 3D model form. Therefore, after the component elements included in the scene where the current user is located are obtained, the above-mentioned correspondence may be queried to obtain a corresponding virtual image. The virtual background image may be generated based on the virtual image.

In detail, in embodiments of the present disclosure, the component elements included in the scene where the current user is located are obtained, and the component elements are processed based on preset image parameters to generate the virtual background image.

At block 210, the current scene brightness of the scene is detected, and in response to detecting that the brightness of the virtual background image is lower than the scene brightness, a sound of turning on a light is simulated and a virtual light source is added to the virtual background image based on the brightness difference between the scene brightness and the brightness of the virtual background image, such that the brightness of the virtual background image matches the scene brightness.

It should be noted that, depending on the application scenario, the current scene brightness may be detected in different ways. For example, the current scene brightness may be detected by a brightness sensor. Similarly, depending on the application scenario, the brightness of preset the virtual background image may be obtained in different ways. For example, the image brightness parameter of the virtual background may be extracted through the image processing technology, and the brightness of the virtual background image may be calculated based on the image brightness parameter. As another example, the preset virtual background image may be input into a related measurement model to determine the brightness of the virtual background image based on outputs of the model.

It may be understood that, in an actual application, the preset image processing method refers to obtaining the virtual background image simply through the conversion based on the component elements included in the scene. In a case that a great difference exists between the brightness of the preset virtual background image and the scene brightness, the brightness characteristics of the face region of the current user is significantly different from that of the preset virtual background image. In this case, in order to realize a natural merging between the face region of the current user and the preset virtual background image in subsequent operations, a virtual light source may be added to the virtual background image to increase the brightness.

In detail, as a possible implementation, the current scene brightness of the scene may be detected. In response to detecting that the brightness of the virtual background image is lower than the scene brightness, the virtual light source may be added to the virtual background image based on the brightness difference between the brightness of the preset virtual background image and the scene brightness, such that the brightness of the virtual background image matches the scene brightness.

In embodiments of the present disclosure, while adding the virtual light source to the virtual background image based on the brightness difference between the brightness of the virtual background image and the scene brightness, in order to improve realness of the fill light and realize interactions with the user, the sound of turning on a light is also simulated. For example, a sound effect "click" is added when the fill light is turned on.

It should be noted that, depending on the specific application scenario, the virtual light source may be added to the virtual background image in different ways based on the brightness difference between the brightness of the virtual background image and the scene brightness. Examples may be described as follows.

Figure 15:
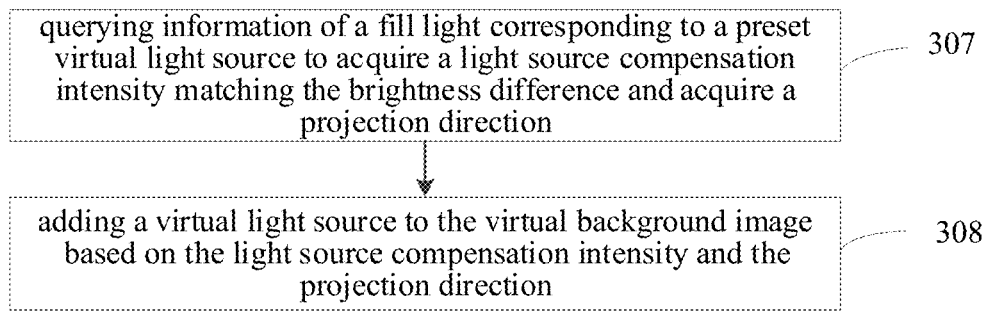
FIG. 15 is a schematic flowchart illustrating an image processing method according to embodiments of the present disclosure.

As a possible implementation, as illustrated in FIG. 15, the block 210 or the block 206 may include the following.

At block 307, fill-light information corresponding to a preset virtual light source is queried, to acquire a light source compensation intensity matching the brightness difference and a projection direction.

At block 308, a virtual light source is added to the virtual background image based on the light source compensation intensity and the projection direction.

It may be understood that, in this example, for each virtual light source, the fill-light information including the light source compensation intensity matching each brightness difference and the projection direction may be set in advance. For example, in a case that the virtual light source is an area light and a spot light, a correspondence of the fill-light information is shown in Table 1.

TABLE 1

| Virtual Light Source | Brightness Difference | Light source compensation intensity | Projection Direction | |
|---|---|---|---|---|
| Area Light | A11 | B11 | C11 | ... |
| | A12 | B12 | C12 | ... |
| | ... | ... | ... | ... |
| Spot Light | A21 | B21 | C21 | ... |
| | A22 | B22 | C22 | ... |
| | ... | ... | ... | ... |
| ... | ... | ... | ... | ... |

After the brightness difference is acquired, the fill-light information corresponding to the preset virtual light source may be queried, to acquire the light source compensation intensity matching the brightness difference and the projection direction. The virtual light source may be added to the virtual background image based on the light source compensation intensity and the projection direction, such that the brightness of the virtual background image matches the brightness in actual scene information.

Figure 16:
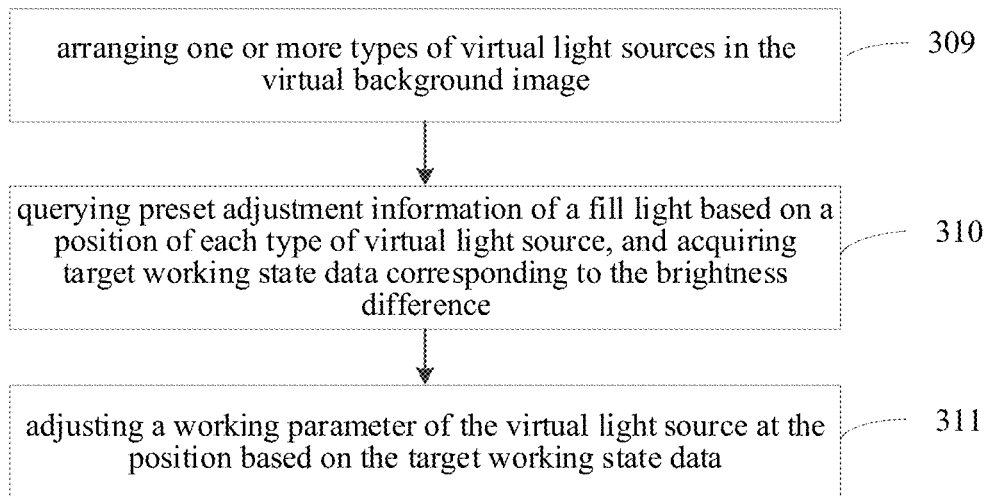
FIG. 16 is a schematic flowchart illustrating an image processing method according to embodiments of the present disclosure.

As another possible implementation, as illustrated in FIG. 16, the block 210 or the block 206 may include the following.

At block 309, one or more types of virtual light sources are arranged in the virtual background image.

At block 310, preset fill-light adjustment information is queried based on a position of each type of virtual light source, and target working state data corresponding to the brightness difference is acquired.

At block 311, a working parameter of the virtual light source at the position is adjusted based on the target working state data.

The working parameter of the virtual light source may include one or a combination of: an angle of pitch, height, brightness, color and intensity.

It may be understood that, in this example, the one or more types of virtual light sources may be set in the virtual background image in advance. The preset fill-light adjustment information may be queried based on the position of each type of virtual light source, and the target working state data corresponding to the brightness difference may be acquired. The target working state data corresponds to a whole brightness effect represented when various virtual light sources are at work.

Furthermore, in order to achieve the brightness effect corresponding to the brightness difference, the working parameter of the virtual light source at the position may be adjusted based on the target working state data. For example, the angle of pitch, the height, the brightness, the color and the intensity of the virtual light source may be adjusted, such that the brightness of the virtual background image matches the brightness in the actual scene information.

At block 211, portrait brightness of the current user is detected, and in response to detecting that the brightness of the preset virtual background image is higher than the portrait brightness, the fill light is turned on based on the brightness difference between the portrait brightness and the brightness of the preset virtual background image and the user position of the user, to illuminate the current user, such that the portrait brightness matches the brightness of the virtual background image. It should be noted that, depending on the application scenario, the portrait brightness in the current scene may be detected in different ways. For example, the portrait brightness in the current scene may be detected by the brightness sensor. Similarly, depending on the application scenario, the brightness of the preset virtual background image may be obtained in different ways. For example, the image brightness parameter of the virtual background may be extracted through the image processing technology, and the brightness of the virtual background image may be calculated based on the image brightness parameter. As another example, the preset virtual background image may be input into a related measurement model to determine the brightness of the virtual background image based on outputs of the model.

It may be understood that, in an actual application, in a case that a great difference exists between the brightness of the preset virtual background image and the portrait brightness in the scene, brightness characteristics of the face region of the current user is significantly different from that of the preset virtual background image. In this case, in order to realize a natural merging between the face region of the current user and the preset virtual background image in subsequent operations, the fill light may be provided to illuminate the current user.

In detail, as a possible implementation, the portrait brightness of the current user may be detected. In response to detecting that the brightness of the preset virtual background image is higher than the portrait brightness, the fill light is turned on based on the brightness difference between the portrait brightness and the brightness of the preset virtual background image and the user position of the user, to illuminate the current user, such that the portrait brightness matches the brightness of the virtual background image.

It should be noted that, depending on the application scenario, the fill light may be turned on in different ways based on the brightness difference between the portrait brightness and the brightness of the preset virtual background image and the user position of the user, to illuminate the current user. Examples may be described as follows.

Figure 17:
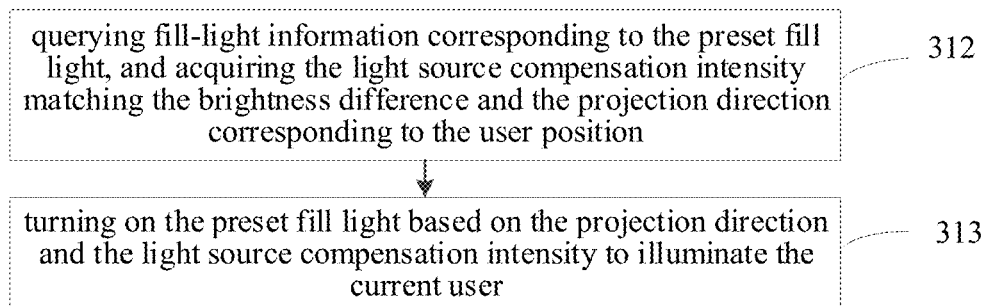
FIG. 17 is a schematic flowchart illustrating an image processing method according to embodiments of the present disclosure.

As a possible implementation, as illustrated in FIG. 17, the block 211 may include the following.

At block 312, fill-light information corresponding to a preset fill light is queried, and light source compensation intensity matching the brightness difference and the projection direction corresponding to the user position are acquired.

At block 313, the preset fill light is turned on based on the projection direction and the light source compensation intensity to illuminate the current user.

It may be understood that, in this example, for each fill light, the fill-light information including the light source compensation intensity matching each brightness difference and the projection direction corresponding to the user position may be set in advance. For example, when there are the fill light 1 and the fill light 2, a correspondence of the fill-light information may be shown in Table 2.

TABLE 2

| Fill Light | Brightness Difference | Light Source Compensation Intensity | Projection Direction | ... |
|---|---|---|---|---|
| Fill Light 1 | A11 | B11 | C11 | ... |
|  | A12 | B12 | C12 | ... |
|  | ... | ... | ... | ... |
| Fill Light 2 | A21 | B21 | C21 | ... |
|  | A22 | B22 | C22 | ... |
|  | ... | ... | ... | ... |
| ... | ... | ... | ... | ... |

After the brightness difference is acquired, the fill-light information corresponding to the preset fill light may be queried, to acquire the light source compensation intensity matching the brightness difference and the projection direction corresponding to the user position. The preset fill light may be turned on based on the projection direction and the light source compensation intensity to illuminate the current user, such that the brightness of the virtual background image matches the brightness in the actual scene information.

Figure 18:
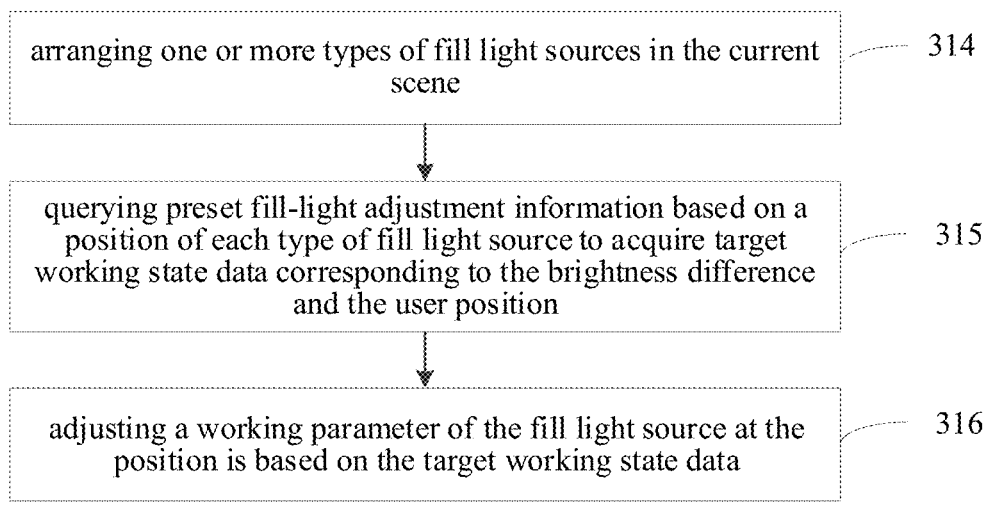
FIG. 18 is a schematic flowchart illustrating an image processing method according to embodiments of the present disclosure.

As another possible implementation, as illustrated in FIG. 18, the block 211 may include the following.

At block 314, one or more types of fill light sources are arranged in the current scene.

At block 315, preset fill-light adjustment information is queried based on a position of each type of fill light source, and target working state data corresponding to the brightness difference and the user position is acquired.

At block 316, a working parameter of the fill light source at the position is adjusted based on the target working state data.

The one or more types of fill light sources may include one or a combination of: the area light, the spot light, the ball light and sunlight. The working parameter of the fill light source may include one or a combination of: the angle of pitch, the height, the brightness, the color and the intensity.

It may be understood that, in this example, the one or more types of fill light sources may be set in the current scene in advance. The preset fill-light adjustment information may be queried based on the position of each type of fill light source, and the target working state data corresponding to the brightness difference may be acquired. The target working state data corresponds to a whole brightness effect represented when various fill light sources are at work.

Furthermore, in order to achieve the brightness effect corresponding to the brightness difference, the working parameter, such as the angle of pitch, the height, the brightness, the color and the intensity, of the fill light source at the position may be adjusted based on the target working state data, such that the brightness of the virtual background image matches the brightness in the actual scene information.

At block 212, the current scene brightness is detected, and in response to detecting that the brightness of the preset virtual background image is lower than the current scene brightness and the brightness difference between the brightness of the preset virtual background image and the current scene brightness is greater than the preset threshold, the exposure time for shooting the current user is determined based on the brightness difference.

At block 213, the scene image of the current user is captured based on the exposure time.

It should be noted that, depending on the application scenario, the current scene brightness may be detected in different ways. For example, the current scene brightness may be detected by the brightness sensor. Similarly, depending on the application scenario, the brightness of the preset virtual background image may be obtained in different ways. For example, the image brightness parameter of the virtual background may be extracted through the image processing technology, and the brightness of the virtual background image may be calculated based on the image brightness parameter. As another example, the preset virtual background image may be input into a related measurement model to determine the brightness of the virtual background image based on outputs of the model.

It may be understood that, in an actual application, in a case that a great difference exists between the brightness of the preset virtual background image and the scene brightness, brightness characteristics of the face region of the current user may be significantly different from that of the preset virtual background image. In this case, in order to realize a natural merging between the face region of the user and the preset virtual background image in subsequent operations, the exposure time for shooting the current scene may be controlled.

In detail, as a possible implementation, the current scene brightness may be detected. In response to detecting that the brightness of the preset virtual background image is lower than the scene brightness and the brightness difference between the brightness of the preset virtual background image and the scene brightness is greater than the preset threshold, the exposure time for shooting the current user is determined based on the brightness difference, and the scene image of the current user is captured based on the exposure time, such that the brightness of the captured scene image and the brightness of the virtual background image are relatively consistent to each other. The preset threshold may be a value experimentally calibrated that affects the merging effect, or set by the user based on his/her visual preference.

Figure 19:
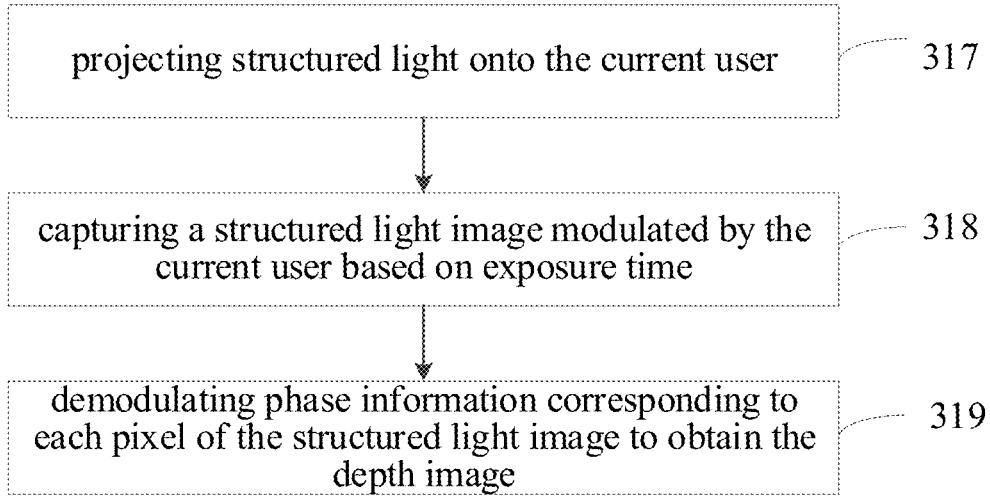
FIG. 19 is a schematic flowchart illustrating an image processing method according to embodiments of the present disclosure.

As illustrated in FIG. 19, as a possible implementation, the block 213 of capturing the depth image of the current user based on the exposure time may include the following.

At block 317, structured light is projected to the current user.

At block 318, a structured light image modulated by the current user is captured based on the exposure time.

At block 319, phase information corresponding to each pixel of the structured light image is demodulated to obtain the depth image.

In this example, as illustrated in FIG. 2, the depth image collection component 12 may include a structured light projector 121 and a structured light camera 122. The block 201 may be implemented by the structured light projector 121, and the blocks 202 and 203 may be implemented by the structured light camera 122.

In other words, the structured light projector 121 may be configured to project the structured light to the current user. The structured light camera 122 may be configured to capture the structured light image modulated by the current user based on the exposure time, and to demodulate the phase information corresponding to each pixel of the structured light image to obtain the depth image.

In detail, after the structured light projector 121 projects the structured light of a certain pattern on the face and body of the current user, the structured light image modulated by the current user may be formed on surfaces of the face and body of the current user. The structured light camera 122 may capture the structured light image modulated based on the exposure time, and demodulate the structured light image to obtain the depth image. The pattern of the structured light may be laser stripes, Gray code, sinusoidal stripes, non-uniform speckles, and the like.

Figure 20:
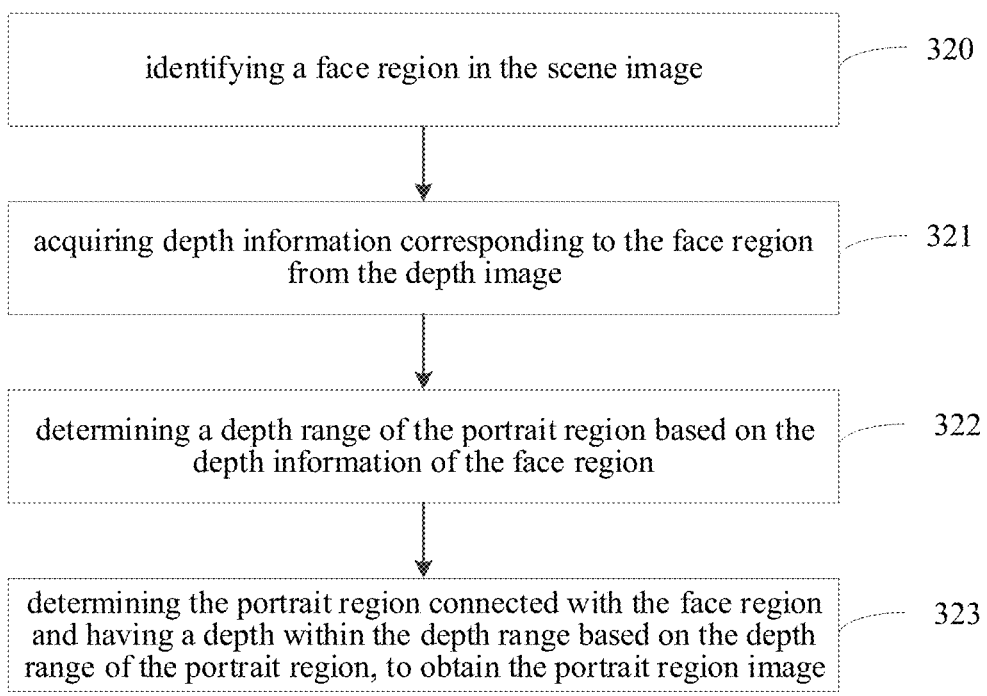
FIG. 20 is a schematic flowchart illustrating an image processing method according to embodiments of the present disclosure.

As illustrated in FIG. 20, as another possible implementation, the block 204 of processing the scene image and the depth image to extract the portrait region of the current user from the scene image, to obtain the portrait region image may include the following.

At block 320, the face region is identified from in the scene image.

At block 321, depth information corresponding to the face region is acquired from the depth image.

At block 322, a depth range of the portrait region is determined based on the depth information of the face region.

At block 323, the portrait region connected with the face region and having a depth within the depth range is determined based on the depth range of the portrait region, to obtain the portrait region image.

As illustrated in FIG. 2, in some implementations, the blocks 320, 321, 322 and 323 may be implemented by the processor 20.

In other words, the processor 20 may be further configured to identify the face region in the scene image, to acquire the depth information corresponding to the face region from the depth image, to determine the depth range of the portrait region based on the depth information of the face region, and to determine the portrait region connected with the face region and having the depth within the depth range based on the depth range of the portrait region, to obtain the portrait region image.

In detail, a trained deep learning model may be used to recognize the face region in the scene image, and then the depth information of the face region may be determined based on the correspondence between the scene image and the depth image. Since the face region includes features such as nose, eyes, ears, lips, and the like, depth data corresponding to each feature in the face region is different in the depth image. For example, in a case that the face is facing the depth image collection component 12, in the depth image captured by the depth image collection component 12, the depth data corresponding to the nose may be relatively small, while the depth data corresponding to the ears may be relatively large. Therefore, the depth information of the face region may be a numerical value or a numerical range. In a case that the depth information of the face region is a numerical value, this numerical value may be obtained by averaging the depth data of the face region. In another example, the numerical value may be obtained by taking a median value of the depth data of the face region.

Since the portrait region includes the face region, i.e., depth of the portrait region and the face region are within a same depth range, the processor 20 may determine the depth information of the face region, set the depth range of the portrait region based on the depth information of the face region, and extract the portrait region having the depth within the depth range and connected with the face region based on the depth range of the portrait region, to obtain the portrait region image.

In this way, the portrait region image may be extracted from the scene image based on the depth information. Since acquisition of the depth information is insusceptible to factors such as illuminance or the color temperature in the environment, the extracted portrait region image may be more accurate.

As illustrated in FIG. 23, in some implementations, the block 226 of performing the interpolation processing on the first portrait region image and/or the first target background image may include the following.

At block 339, in response to determining that the resolution of the first portrait region image is greater than the resolution of the first target background image, the interpolation processing is performed on the first target background image to obtain the second target background image. The resolution of the second target background image matches the resolution of the first portrait region image.

At block 340, in response to determining that the resolution of the first portrait region image is less than the resolution of the first target background image, the interpolation processing is performed on the first portrait region image to obtain the second portrait region image. The resolution of the second portrait region image matches the resolution of the first target background image.

In other words, in a case that the resolution of the first portrait region image does not match the resolution of the first target background image, the interpolation operation may be performed on the lower-resolution image, to create new pixels and to generate gray values for those pixels whose gray values are unknown using the gray values of those pixels whose gray values are known, such that the resolution of the lower-resolution image may be increased and the processed portrait region image may have the same resolution with the target background image.

In detail, for the first portrait region image and the first target background image, in a case that the resolution of the first target background image is lower, the interpolation processing may be performed on the first target background image to increase the resolution of the first target background image. Therefore, the second target background image having the resolution matching the resolution of the first portrait region image may be obtained. In addition, for the first portion region image and the first target background image, in a case that the resolution of the first portrait region image is lower, the interpolation processing may be performed on the first portrait region image to increase the resolution of the first portrait region image. Therefore, the second portrait region image having the resolution matching the resolution of the first target background image may be obtained.

In some implementations, in a case that the resolution of the first portrait region image is different from the resolution of the first target background image and both of them are relatively low, in order to improve clarity of the merged image, the interpolation operation of different scales may be performed on the first portrait region image and the first target background image, to obtain the second portrait region image and the second target background image respectively. The resolution of the second portrait region image matches the resolution of the second target background image.

In detail, the interpolation operation, such as a nearest neighbor interpolation algorithm, a bilinear interpolation algorithm, a bicubic interpolation algorithm, and a fractal algorithm, may be performed on the first target background image and/or the first portrait region image.

As an example, the resolution of the first target background image is less than the resolution of the first portrait region image, such that the bilinear interpolation algorithm is performed on the first target background image to obtain the second target background image having the resolution matching the resolution of the first portion region image may be obtained.

In detail, a value of a newly created pixel whose value is unknown in the second target background image may be obtained by performing a weighting and averaging algorithm on four neighboring pixels in a block of 2*2 pixels neighboring the pixel whose value is unknown in the first target background image.

As illustrated in FIG. 24, for example, values of the four neighboring pixels in the block of 2*2 pixels neighboring the pixel P=(x, y) whose value is unknown may be represented by functions $f(Q_{12})$, $f(Q_{22})$, $f(Q_{11})$ and $f(Q_{21})$, respectively, where $Q_{12}=(x_1, y_2)$, $Q_{22}=(x_2, y_2)$, $Q_{11}=(x_1, y_1)$, $Q_{21}=(x_2, y_1)$ are respectively the four neighboring pixels in the block of 2*2 pixels neighboring the pixel P=(x, y) whose value is unknown. The value of the unknown function f at point P=(x, y) needs to be obtained.

The linear interpolation may be performed in the x direction in the following manner to obtain R1 and R2.

$$f(R_1) \approx \frac{x_2 - x}{x_2 - x_1} f(Q_{11}) + \frac{x - x_1}{x_2 - x_1} f(Q_{21}), \text{ where } R_1 = (x, y_1);$$

$$f(R_2) \approx \frac{x_2 - x}{x_2 - x_1} f(Q_{12}) + \frac{x - x_1}{x_2 - x_1} f(Q_{22}), \text{ where } R_2 = (x, y_2).$$

The linear interpolation may be performed in the y direction in the following manner to obtain P.

$$f(P) \approx \frac{y_2 - y}{y_2 - y_1} f(R_1) + \frac{y - y_1}{y_2 - y_1} f(R_2)$$

With the above methods, the value of the created pixel whose value is unknown in the second target background image may be obtained based on the values of the pixels whose values are known in the first target background image. Therefore, with the interpolation operation, the second target background image having the resolution matching the resolution of the first portrait region image may be generated based on the first target background image.

It should be noted that, in order to avoid that distortion occurs to the processed image, when performing the interpolation processing on the first portrait region image and/or the first target background image, the interpolation operations of an equal scale may be performed in the x direction and the y direction, such that the image may be magnified in the same scale in the x and y directions. For example, the resolution of the first target background image is 400×300 pixels per inch (PPI). In a case that, with the interpolation operation, the number of pixels in the x direction of the first target background image is doubled, in order to avoid that the distortion occurs to the obtained second target background image, the number of pixels in the y direction of the first target background image may also be doubled with the interpolation operation of the same scale. That is, the resolution of the obtained second target background image may be 800×600 PPI.

In this manner, by performing the interpolation operation on the first portrait region image and/or the first target background image, the second portrait region image and the second target background image are obtained that the resolution of the second portrait region image matches the solution of the second target background image. The second portrait region image and the second target background image may be merged. In the merged image, the portrait region and the background region may be merged naturally, thereby optimizing the visual effect of the merged image.

Figure 25:
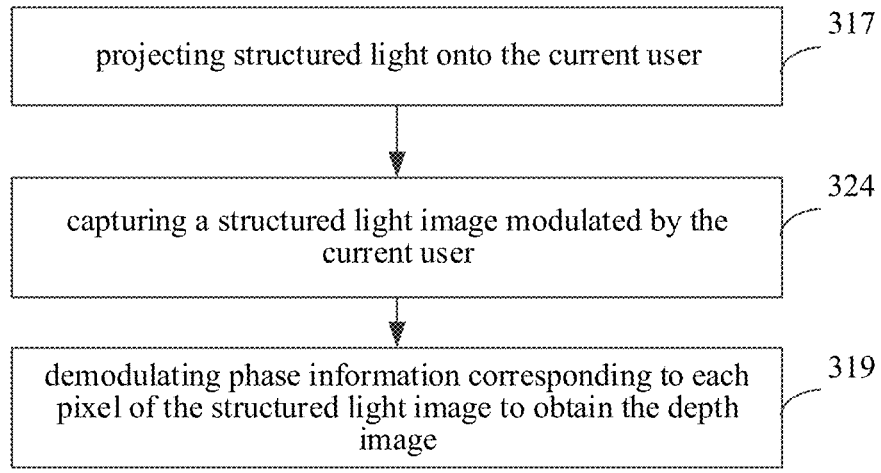
FIG. 25 is a schematic flowchart illustrating an image processing method according to embodiments of the present disclosure.

As illustrated in FIG. 25, in some implementations, the block 202 of acquiring the depth image of the current user may include the following.

At block 317, structured light is projected to the current user.

At block 324, a structured light image modulated by the current user is captured.

At block 319, phase information corresponding to each pixel of the structured light image is demodulated to obtain the depth image.

As illustrated in FIG. 2, in some implementations, the depth image collection component 12 may include the structured light projector 121 and the structured light camera 122. The block 317 may be implemented by the structured light projector 121, and the blocks 324 and 319 may be implemented by the structured light camera 122.

In other words, the structured light projector 121 may be configured to project the structured light to the current user, and the structured light camera 122 may be configured to capture the structured light image modulated by the current user, and to demodulate the phase information corresponding to each pixel of the structured light image to obtain the depth image.

In detail, after the structured light projector 121 projects the structured light of a certain pattern on the face and body of the current user, the structured light image modulated by the current user may be formed on surfaces of the face and body of the current user. The structured light camera 122 may be configured to capture the structured light image modulated and demodulate the structured light image to obtain the depth image. The pattern of the structured light may be laser stripes, Gray code, sinusoidal stripes, non-uniform speckles, and the like.

In some implementations, the block 319 of demodulating the phase information corresponding to each pixel of the structured light image to obtain the depth image may include the following.

The phase information corresponding to each pixel of the structured light image is demodulated. The phase information is converted into the depth information. The depth image is generated based on the depth information.

As illustrated in FIG. 2, in some implementations, the structured light camera 122 may be further configured to demodulate the phase information corresponding to each pixel of the structured light image, to convert the phase information into the depth information, and to generate the depth image based on the depth information.

In detail, compared with the structured light that is not modulated, the phase information of the modulated structured light changes. Therefore, the structured light presented in the structured light image is distorted. The changed phase information may characterize the depth information of objects. Consequently, the structured light camera 122 may obtain the phase information corresponding to each pixel by demodulating the structured light image, and calculate the depth information based on the phase information, so as to obtain the depth image.

In order to help those skilled in the art to clearly understand the process of capturing the depth image of the face and body of the current user based on structures, the following describes a specific principle of the process with a widely-used grating projection technology (stripe projection technology) as an example. The grating projection technology belongs to the structured surface light in a broad sense.

Figure 21A:
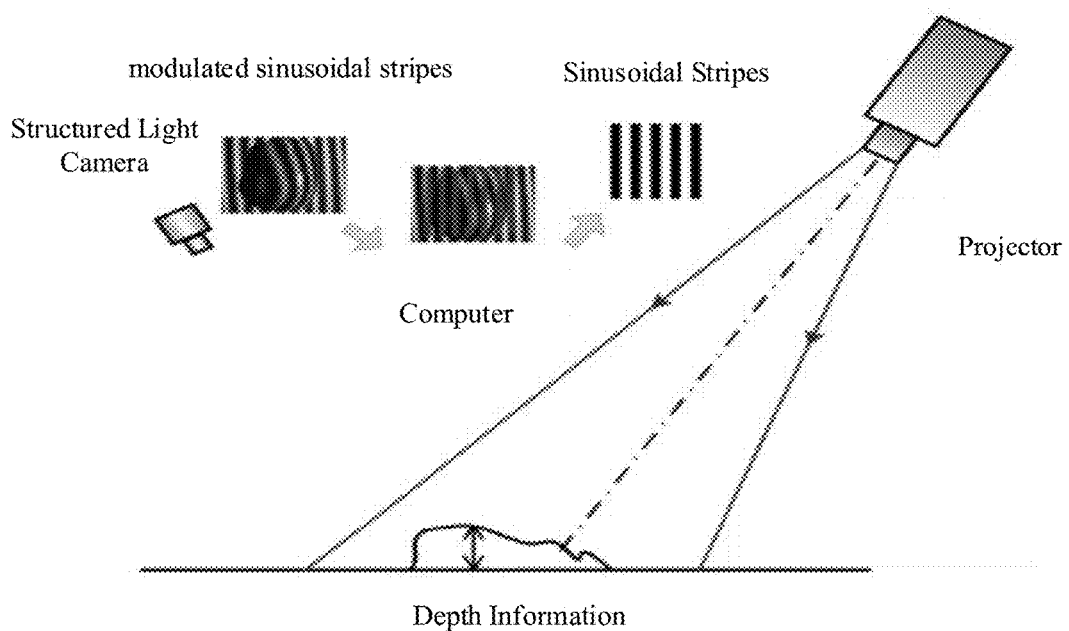

As illustrated in FIG. 21A, when using structured area light for projection, sinusoidal stripes may be generated by computer programs and projected onto the object to be measured through the structured light projector 121. A curvature degree of the stripes that is modulated by the object may be obtained by the structured light camera 122. The curved stripes may be demodulated obtain the phase. The phase may be converted into the depth information to acquire the depth image. In order to avoid errors or error coupling, the depth image collection component 12 needs to be calibrated before obtaining the depth information based on the structured light. The calibration may include calibration of geometric parameters (for example, relative position parameters between the structured light camera 122 and the structured light projector 121), calibration of internal parameters of the structured light camera 122, calibration of internal parameters of the structured light projector 121, and the like.

Figure 21B:
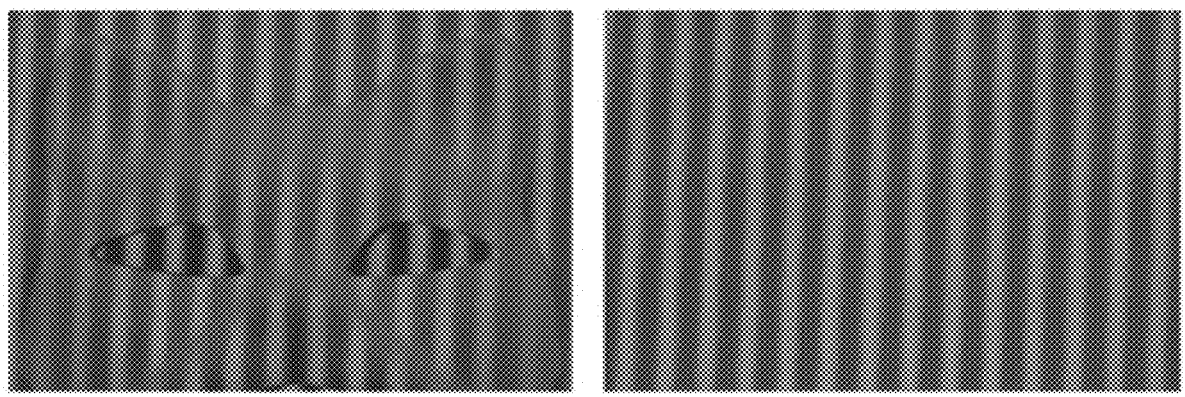

In detail, firstly, the sinusoidal stripes are produced by the computer programs. Since in subsequent operations, it is necessary to use the distorted stripes to obtain the phase, through for example a four-step phase shift method, four images of stripes with the phase difference of $\pi/2$ may be generated. The structured light projector 121 may project the four images of stripes onto the object to be measured (onto the mask as illustrated in FIG. 21A) in a time-sharing manner. The structured light camera 122 may capture the image illustrated on the left of FIG. 21B, and simultaneously the image of stripes on the reference surface as illustrated on the right of FIG. 21B are read.

Secondly, a phase recovery is performed. The structured light camera 122 may be configured to calculate the modulated phase based on the four captured images of modulated stripes (i.e., structured light images). The phase image obtained here is a truncated phase image. This is because that the result of the four-step phase shift algorithm is calculated by an arctangent function, such that the phase of the modulated structured light is limited in a range of $[-\pi, \pi]$. That is, whenever the modulated phase is outside the range of $[-\pi, \pi]$, the phase may be converted to this range by resetting the phase. Principle values of the resultant phase is illustrated in FIG. 21C.

In the process of the phase recovery, de-jump processing is required, to convert the truncated phase into a continuous phase. As illustrated in FIG. 21D, the left image indicates a modulated continuous phase, and the right image indicates a reference continuous phase.

Figure 21E:
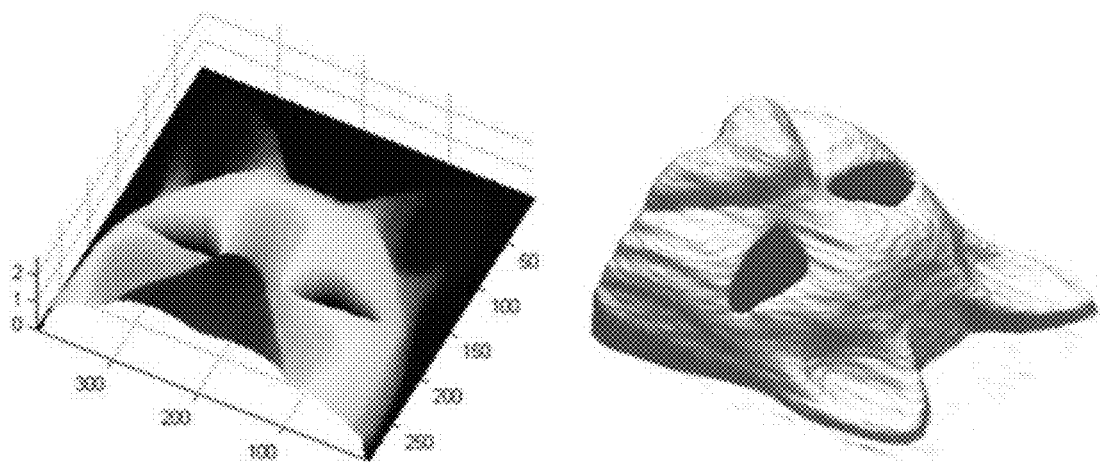

Thirdly, the modulated continuous phase is subtracted from the reference continuous phase to obtain the phase difference (i.e., the phase information). The phase difference represents the depth information of the object to be measured relative to the reference surface. The phase difference is substituted into a conversion formula (parameters involved in the formula are calibrated) between the phase and the depth to obtain a three-dimensional model of the object to be measured as illustrated in FIG. 21E.

It should be understood that, in an actual application, depending on the application scenario, the structured light used in embodiments of the present disclosure may have any other patterns besides the above grating pattern.

As a possible implementation, the present disclosure may also use structured speckle light to obtain the depth information of the current user.

Figure 22A:
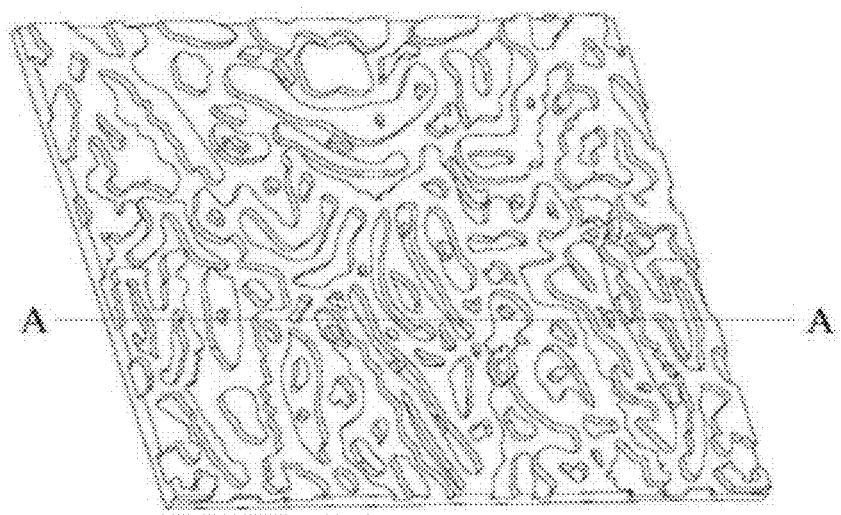
FIGS. 22A to 22B are schematic diagrams illustrating a measurement scenario of structured light according to embodiments of the present disclosure.
Figure 22B:
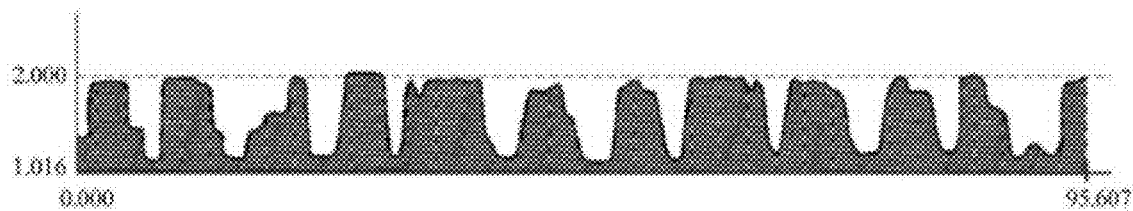

In detail, a method for obtaining the depth information with the structured speckle light is to use a substantially flat diffractive element. The substantially flat diffractive element is carved with a diffraction structure that has a specific phase distribution and a cross section of the substantially flat diffractive element has two or more concave-convex steps of carved structures. Thickness of a base of the diffractive element is approximately 1 micron, and heights of the steps are not equal to each other, which may range from 0.7 microns to 0.9 microns. FIG. 22A illustrates a partial diffraction structure of a collimating and beam-splitting element according to embodiments. FIG. 22B illustrates a sectional view along a section A-A, and units of the abscissa and the ordinate are both micros. A speckle pattern generated by the structured speckle light has a high randomness, and the speckle pattern may change with distance. Therefore, before the depth information is obtained using the structured speckle light, it is required to calibrate speckle patterns in space. For example, within a range of 0 to 4 meters away from the structured light camera 122, planes positioned every 1 cm from the structured light camera 122 may be taken as the reference planes such that 400 speckle images may be saved after the calibration. The shorter the distance of calibration, the higher the accuracy of the acquired depth information. Subsequently, the structured light projector 121 may project the structured speckle light onto the object to be measured (i.e., the current user). Height difference of the surface of the object to be measured may cause changes in the speckle pattern of the structured speckle light projected onto the object to be measured. After the structured light camera 122 captures the speckle pattern (i.e., the structured light image) projected onto the object to be measured, the structured light camera 122 may be configured to perform a cross-correlation operation on the speckle pattern and the 400 speckle images saved after the calibration, so as to obtain 400 relevance images. The position of the object to be measured in the space may cause a peak of the relevance image. The depth information of the object to be measured may be obtained by superimposing the above peaks and performing an interpolation operation.

Multiple beams of diffracted light may be obtained after the light is diffracted by an ordinary diffractive element. Intensities of the multiple beams of diffracted light are highly different, and a risk of harming the human eyes is high. Even if the diffracted light is diffracted again, uniformity of the light beam obtained is poor. Therefore, the projection effect of the light diffracted by the ordinary diffractive element onto the object to be measured is poor. In embodiments, the collimating and beam-splitting element may be used. This element not only has a function of light collimating on non-collimated light, but also has a function of light splitting. That is, multiple beams of collimated light may exit in different directions after the non-collimated light reflected by the mirror passes through the collimating and beam-splitting element. Cross-sectional areas of the multiple beams of collimated light may be approximately equal to each other, and energy fluxes may be approximately equal to each other, such that the projection effect of light speckles after the light diffraction is good, In this case, light from the laser is dispersed to the multiple light beams, thereby further reducing the risk of harming the human eyes. Compared with other structured light of uniform arrangement, the structured speckle light consumes less power while achieving the same collection effect.

Figure 26:
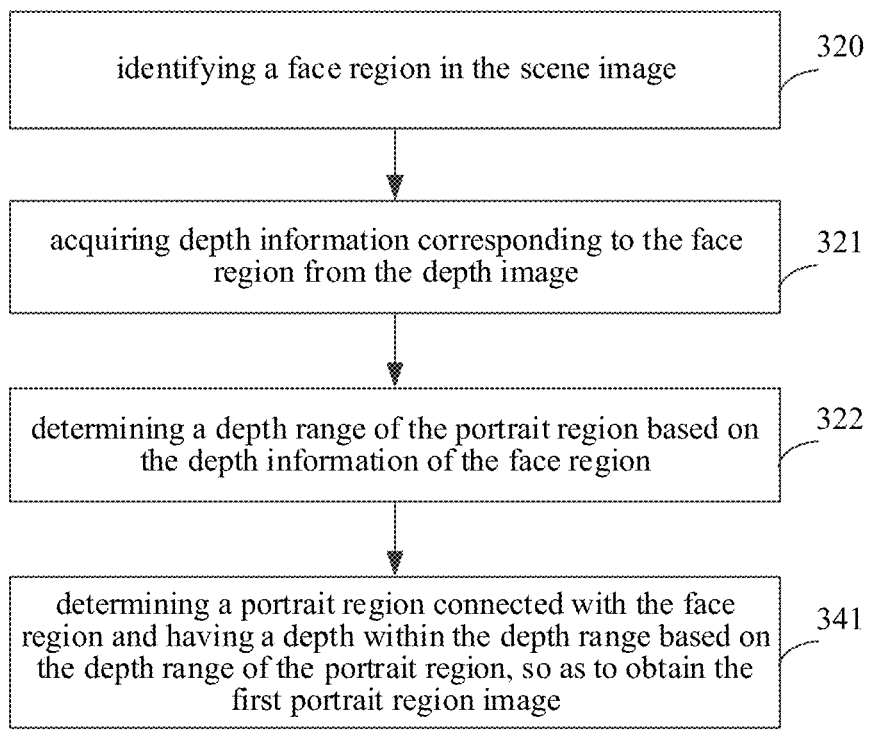
FIG. 26 is a schematic flowchart illustrating an image processing method according to embodiments of the present disclosure.

As illustrated in FIG. 26, in some implementations, the block 224 of processing the scene image and the depth image to extract the portrait region of the current user in the scene image, to obtain the first portrait region image may include the following.

At block 320, the face region in the scene image is identified.

At block 321, the depth information corresponding to the face region is acquired from the depth image.

At block 322, the depth range of the portrait region is determined based on the depth information of the face region.

At block 341, the portrait region connected with the face region and having a depth within the depth range is determined based on the depth range of the portrait region, so as to obtain the first portrait region image.

As illustrated in FIG. 2, in some implementations, the blocks 320, 321, 322 and 341 may be implemented by the processor 20.

In other words, the processor 20 may be further configured to identify the face region in the scene image, to acquire the depth information corresponding to the face region from the depth image, to determine the depth range of the portrait region based on the depth information of the face region, and to determine the portrait region connected with the face region and having a depth within the depth range based on the depth range of the portrait region, so as to obtain the first portrait region image.

In detail, a trained deep learning model may be used to identify the face region in the scene image, and to determine the depth information of the face region based on a correspondence between the scene image and the depth image. Since the face region includes features such as nose, eyes, ears, lips, and the like, the depth data corresponding to the features included in the face region are different in the depth image. For example, in a case that the face is facing the depth image collection component 12, in the depth image captured by the depth image collection component 12, the depth data corresponding to the nose may be relatively small, while the depth data corresponding to the ears may be relatively large. Therefore, the depth information of the face region may be a numerical value or a numerical range. In a case that the depth information of the face region is a numerical value, the numerical value may be obtained by averaging the depth data of the face region. In another example, the numerical value may be obtained by taking a median value of the depth data of the face region.

Since the portrait region includes the face region, i.e., depth of the portrait region and the face region are within a same depth range, the processor 20 may determine the depth information of the face region, set the depth range of the portrait region based on the depth information of the face region, and extract the portrait region having a depth within the depth range and connected with the face region based on the depth range of the portrait region, to obtain the first portrait region image.

In this way, the first portrait region image may be extracted from the scene image based on the depth information. Since acquisition of the depth information is insusceptible to factors such as illuminance or color temperature in the environment, the extracted first portrait region image may be more accurate.

Figure 27:
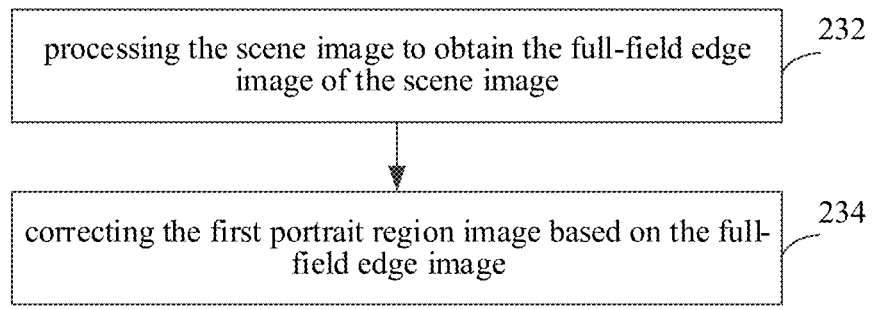
FIG. 27 is a schematic flowchart illustrating an image processing method according to embodiments of the present disclosure.

As illustrated FIG. 27, in some implementations, the image processing method may further include the following.

At block 232, the scene image is processed to obtain a full-field edge image of the scene image.

At block 234, the first portrait region image is corrected based on the full-field edge image.

As illustrated in FIG. 2, in some implementations, the blocks 232 and 234 may be implemented by the processor 20.

In other words, the processor 20 may be further configured to process the scene image to obtain the full-field edge image of the scene image, and to correct the first portrait region image based on the full-field edge image.

The processor 20 may be configured to perform edge extraction on the scene image to obtain the full-field edge image. Edges of the full-field edge image may include edges of the current user and edges of background objects in the scene where the current user is located. In detail, the edge extraction may be performed on the scene image by a Canny operator. The core of the edge extraction algorithm of the Canny operator mainly includes the followings. A 2D Gaussian filter template may be used to perform convolution operation on the scene image to eliminate noise. A differential operator may be used to obtain a gradient value of the gray value of each pixel, a gradient direction of the gray value of each pixel may be calculated based on the gradient value, and adjacent pixels along the gradient direction may be found based on the gradient direction. Each pixel is traversed. If the gray value of a pixel is less than gray values of two adjacent pixels along the gradient direction, it may be considered that the pixel is not an edge point. In this way, pixels at edges of the scene image may be determined, so as to obtain the full-field edge image after the edge extraction.

After obtaining the full-field edge image, the processor 20 may be further configured to correct the first portrait region image based on the full-field edge image. It may be understood that the first portrait region image is obtained by including all pixels in the scene image that are connected with the face region and having a depth within the set depth range. In some scenes, there may be some objects that are connected with the first face region and having a depth within the depth range. Therefore, in order to make the extracted first portrait region image more accurate, the full-field edge image may be used to correct the first portrait region image.

Further, the processor 20 may be configured to correct the corrected first portrait region image again. For example, the processor 20 may perform expansion processing on the corrected first portrait region image to expand the first portrait region image, thereby retaining edge details of the first portrait region image.

Figure 28:
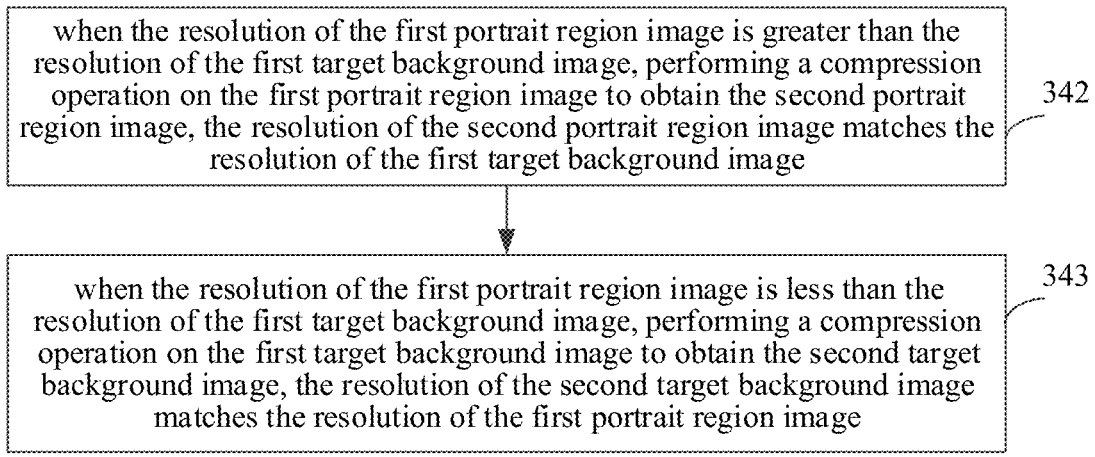
FIG. 28 is a schematic flowchart illustrating an image processing method according to embodiments of the present disclosure.

As illustrated in FIG. 28, in some implementations, the block 228 of performing the compression processing on the first portrait region image and/or the first target background image may include the following.

At block 342, in response to determining that the resolution of the first portrait region image is greater than the resolution of the first target background image, the compression processing is performed on the first portrait region image to obtain the second portrait region image. The resolution of the second portrait region image matches the resolution of the first target background image.

At block 343, in response to determining that the resolution of the first portrait region image is less than the resolution of the first target background image, the compression processing is performed on the first target background image to obtain the second target background image. The resolution of the second target background image matches the resolution of the first portrait region image.

In other words, in a case that the resolution of the first portrait region image does not match the resolution of the first target background image, the compression processing may be performed on a higher-resolution image to reduce the resolution of the higher-resolution image, such that the resolution of the processed portrait region image is same to the resolution of the target background image.

In detail, for the first portrait region image and the first target background image, in a case that the resolution of the first portrait region image is higher, the compression operation may be performed on the first portrait region image to reduce the resolution of the first portrait region image. Therefore, the second portrait region image having the resolution matching the resolution of the first target background image may be obtained. For the first portrait region image and the first target background image, in a case that the resolution of the first target background image is higher, the compression operation may be performed on the first target background image to reduce the resolution of the first target background image. Therefore, the second target background image having the resolution matching the resolution of the first portrait region image may be obtained.

In detail, the compression operation may be performed on the first portrait region image and/or the first target background image in different ways.

For example, the first target background image and/or the first portrait region image may be down-sampled by taking one point every s points in each row and each column to generate the second portrait region image and/or the second target background image.

For example, it may be preset to determine that the portrait region image matches the target background image in a case that a difference between the resolution of the portrait region image and the resolution of the target background image is less than 50. In a case that the resolution of the first portrait region image is 800*600 PPI and the resolution of the first target background image is 400*300 PPI, the first portrait region image may be down-sampled by s times. That is, the first portrait region image is down-sampled at every s points in each row and each column to obtain the second portrait region image having the resolution of N=(800/s)*(600/s), where N is a value greater than 400*300-50 and less than 400*300+50. The resolution of the generated second portrait region image matches the resolution of the first target background image.

In another example, in the first target background image and/or the first portrait region image, adjacent s*s pixels may be used as one pixel. The value of this pixel may be an average of the s*s pixels. Therefore, the second target background image and/or the second portrait region image may be generated.

It should be noted that, in order to avoid that distortion occurs to the processed image, when performing the compression processing on the first portrait region image and/or the first target background image, compression operation of an equal scale may be performed in the x direction and the y direction, such that the image may be downsized in the same scale in the x and y directions. For example, for the first target background image having the resolution of 800× 600 PPI, in a case that the number of pixels in the x direction of the first target background image may be reduced by half after the compression operation, in order to avoid that distortion occurs to the obtained second target background image, the number of pixels in the y direction of the first target background image may also be reduced by half after the compression. That is, the resolution of the obtained second target background image may be 400×300 PPI.

In this manner, by performing the compression operation on the first portrait region image and/or the first target background image, the second portrait region image and the second target background image that the resolutions match with each other may be obtained. The second portrait region image and the second target background image that the resolutions match with each other may be merged, such that in the merged image, the portrait region and the background region may be merged naturally, thereby optimizing the visual effect of the merged image.

In addition, for the first portrait region image and the first target background image, the compression processing may be performed on a higher-resolution image, while the interpolation processing may be performed on a lower-resolution image, to obtain respectively the second portrait region image and the second target background image that resolutions match each other.

It should be noted that, in embodiments of the present disclosure, the second portrait region image may be merged with the second target background image after edges of the second portrait region image are feathered, such that the edges of the portrait region image may be smoothly and naturally transited to the second target background image, presenting a better visual effect of the merged image.

In some implementations, in a case that the first target background image is selected by the processor 20, in order to prevent the processing amount of the processor 20 from being too high, an image having a small resolution difference from the resolution of the first portrait region image may be selected from multiple background images to reduce a processing pressure of the processor 20. That is, before the block 225, the image processing method may further include the following. The first target background image is selected from the multiple background images based on the resolution of the first portrait region image. A difference between the resolution of the first target background image and the resolution of the first portrait region image is less than a threshold.

The threshold may be set as required. For example, the threshold may be determined based on processing power or processing speed of the processor 20. In a case that the processing speed of the processor 20 is fast, the threshold may be set to a large value. In a case that the processing speed of the processor 20 is slow, the threshold may be set to a small value.

The multiple background images may be dynamic images or still images, and may be stored in the electronic device 1000 or acquired through network resources, which is not limited herein.

In detail, after obtaining the first portrait region image, the processor 20 may determine the resolution of the first portrait region image, obtain the multiple background images, and determine resolutions of the multiple background images. The processor 20 may further determine whether a difference between the resolution of each background image and the resolution of the first portrait region image is less than the threshold, so as to select a background image having the resolution difference from the resolution of the first portrait region image less than the threshold as the first target background image.

In a case that there are several background images having resolution differences from the resolution of the first portrait region image less than the threshold, an image having the smallest resolution difference from the resolution of the first portrait region image may be selected from the several background images as the first target background image.

By selecting the image having the resolution difference from the resolution of the first portrait region image less than the threshold as the first target background image, the processing pressure of the processor 20 may be reduced, and the speed of image processing may be increased.

Figure 29:
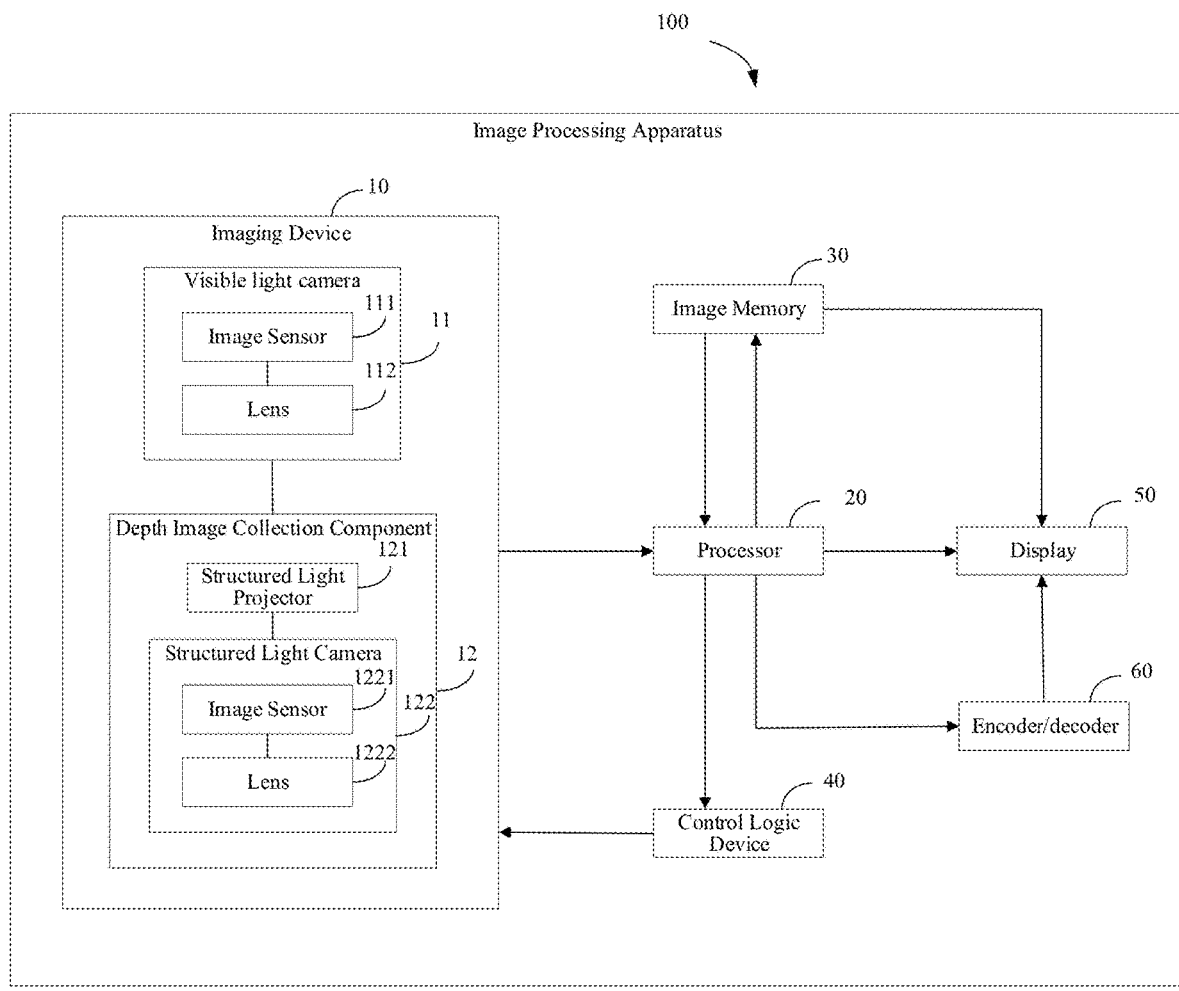
FIG. 29 is a schematic block diagram illustrating an image processing apparatus according to embodiments of the present disclosure.

As illustrated in FIG. 3 and FIG. 29, implementations of the present disclosure further provide an electronic device 1000. The electronic device 1000 may include the image processing apparatus 100. The image processing apparatus 100 may be implemented by hardware and/or software. The image processing apparatus 100 may include an imaging device 10 and the processor 20.

The imaging device 10 may include a visible light camera 11 and a depth image collection component 12.

In detail, the visible light camera 11 may include an image sensor 111 and a lens 112. The visible light camera 11 may be configured to capture color information of the current user to obtain the scene image of the scene. The image sensor 111 may include a color filter array (such as a Bayer filter array) and there may be one or more lenses 112. During the process of capturing the scene image by the visible light camera 11, each imaging pixel in the image sensor 111 may sense light intensity and wavelength information from the scene to be captured to generate a set of original image data. The image sensor 111 may send the set of original image data to the processor 20, and the processor 20 may obtain a color scene image after performing operations such as denoising and interpolation on the original image data. The processor 20 may process image pixels in the original image data one by one in various formats. For example, each image pixel may have a bit depth of 8, 10, 12 or 14 bits, and the processor 20 may process each image pixel based on the same or different bit depths.

The depth image collection component 12 may include a structured light projector 121 and a structured light camera 122. The depth image collection component 12 may be configured to capture depth information of the current user to obtain a depth image. The structured light projector 121 may be configured to project structured light onto the current user. The pattern of the structured light may be laser stripes, Gray code, sinusoidal stripes, or a randomly arranged speckle pattern. The structured light camera 122 may include an image sensor 1221 and a lens 1222. There may be one or more lenses 1222. The image sensor 1221 may be configured to capture a structured light image generated by projecting by the structured light projector 121 onto the current user. The structured light image may be sent by the depth collection component 12 to the processor 20 for processing such as demodulation, phase recovery and phase information calculation to obtain the depth information of the current user.

In some implementations, functions of the visible light camera 11 and the structured light camera 122 may be implemented by a single camera. That is, the imaging device 10 may include a single camera and a single structured light projector 121. The above camera may be configured to capture a scene image, as well as a structured light image.

In addition to using the structured light to obtain the depth image, it is also possible to obtain depth image of the current user through a depth image acquisition method such as a binocular vision method, a depth image acquisition method based on time of flight (TOF) and so on.

The processor 20 may be further configured to merge the portrait region image and the background image to obtain the merged image. When extracting the portrait region image, the processor 20 may be configured to extract a two-dimensional portrait region image from the scene image in combination with the depth information of the depth image, or the processor 20 may be configured to establish a three-dimensional image of the portrait region based on the depth information of the depth image, and perform color filling on the three-dimensional portrait region in combination with the color information of the scene image to obtain a three-dimensional color portrait region image. Consequently, merging and processing the portrait region image and the background image may refer to that the two-dimensional portrait region image and the background image may be merged to obtain the merged image, or the three-dimensional color portrait region image and the background image may be merged to obtain the merged image.

The image processing apparatus 100 may further include an image memory 30. The image memory 30 may be embedded in the electronic device 1000, or may be a memory independent from the electronic device 1000. The image memory 30 may include a feature of direct memory access (DMA). Raw image data collected by the visible light camera 11 or relevant data of the structured light image collected by the depth image collection component 12 may be transferred to the image memory 30 for storing or buffering. The processor 20 may read the raw image data from the image memory 30 for processing to obtain the scene image, and may also read the relevant data of the structured light image from the image memory 30 for processing to obtain the depth image. In addition, the scene image and the depth image may also be stored in the image memory 30 such that the processor 20 may call them for processing at any time. For example, the processor 20 is configured to call the scene image and the depth image to extract the portrait region, and merge the extracted portrait region image and the background image to obtain the merged image. The background image and the merged image may also be stored in the image memory 30.

The image processing apparatus 100 may further include a display 50. The display 50 may directly acquire the merged image from the processor 20 or acquire the merged image from the image memory 30. The display 50 may be configured to display the merged image for viewing by the user, or for processing by a graphics engine or a graphics processing unit (GPU). The image processing apparatus 100 may further include an encoder/decoder 60. The encoder/decoder 60 may be configured to encode and decode image data of the scene image, the depth image and the merged image. The encoded image data may be stored in the image memory 30, and may be decompressed by the decoder and may be displayed on the display 50 after the decompression. The encoder/decoder 60 may be implemented by a central processing unit (CPU), a GPU or a coprocessor. In other words, the encoder/decoder 60 may be one or more of the CPU, the GPU and the coprocessor.

The image processing apparatus 100 further may include a control logic device 40. When the imaging device 10 is capturing an image, the processor 20 may be configured to analyze data obtained by the imaging device to determine statistical image information of one or more control parameters (for example, exposure time) of the imaging device 10. The processor 20 may send the statistical image information to the control logic device 40, and the control logic device 40 may control the imaging device 10 to capture an image based on determined control parameters. The control logic device 40 may include a processor and/or a microcontroller for executing one or more routines, such as firmware. The one or more routines may determine the control parameters of the imaging device 10 based on the received statistical image information.

Figure 30:
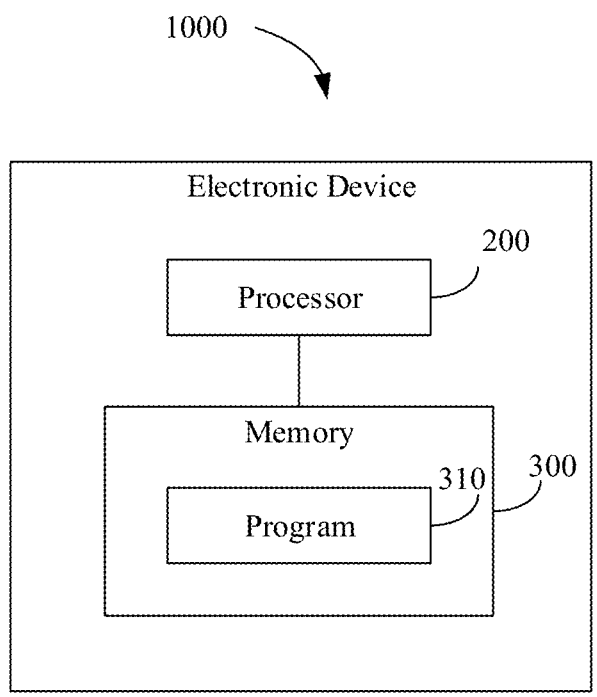
FIG. 30 is a schematic block diagram illustrating an electronic device according to embodiments of the present disclosure.

As illustrated in FIG. 30, the electronic device 1000 according to implementations of the present disclosure may include one or more processors 200, a memory 300 and one or more programs 310. The one or more programs 310 are stored in the memory 300 and configured to be executed by the one or more processors 200. The one or more programs 310 include instructions for executing the image processing method according to any one of the implementations.

For example, the one or more programs 310 may include instructions for performing the image processing method described as follows.

At block 101, a background image and a portrait region image of the current user that the preset parameter of the background image matches the preset parameter of the portrait region image are acquired.

At block 102, the portrait region image and the background image are merged to obtain a merged image.

For another example, the one or more programs 310 may further include instructions for performing the image processing method described as follows.

At block 201, scene brightness of the scene is detected and a virtual background image matching the scene brightness is acquired.

At block 202, a scene image of the current user is acquired.

At block 203, a depth image of the current user is acquired.

At block 204, the scene image and the depth image are processed to extract the portrait region of the current user from the scene image, to obtain the portrait region image.

At block 205, the portrait region image and the virtual background image are merged to obtain the merged image.

The computer readable storage medium according to implementations of the present disclosure may include a computer program used in combination with the electronic device 1000 capable of capturing an image. The computer program may be executed by the processor 200 to execute the image processing method according to any one of the above implementations.

For example, the computer program may be executed by the processor 200 to implement the image processing method described as follows.

At block 101, the background image and the portrait region image of the current user that the preset parameter of the background image matches the preset parameter of the portrait region image are acquired.

At block 102, the portrait region image and the background image are merged to obtain the merged image.

As another example, the computer program may also be executed by the processor 200 to implement the image processing method described as follows.

At block 201, scene brightness of the scene is detected and a virtual background image matching the scene brightness is acquired.

At block 202, a scene image of the current user is acquired.

At block 203, a depth image of the current user is acquired.

At block 204, the scene image and the depth image are processed to extract a portrait region of the current user from the scene image, to obtain a portrait region image.

At block 205, the portrait region image and the virtual background image are merged to obtain a merged image.

In the description, reference throughout this specification to "an embodiment," "some embodiments," "an example," "a specific example," or "some examples," means that a particular feature, structure, material, or characteristic described in connection with the embodiment or example is included in at least one embodiment or example of the present disclosure. The appearances of the above phrases in various places throughout this specification are not necessarily referring to the same embodiment or example of the present disclosure. Furthermore, the particular features, structures, materials, or characteristics may be combined in any suitable manner in one or more embodiments or examples. In addition, different embodiments or examples and features of different embodiments or examples described in the specification may be combined by those skilled in the art without mutual contradiction.

In addition, terms such as "first" and "second" are used herein for purposes of description, are not intended to indicate or imply relative importance or significance, or imply the amount of this feature. Thus, the feature defined with "first" and "second" may comprise at least one this feature. In the description of the present disclosure, "a plurality of" means at least two, for example, two or three, unless specified otherwise.

Any process or method described in a flow chart or described herein in other ways may be understood to include one or more modules, segments or portions of codes of executable instructions for achieving specific logical functions or steps in the process, and the scope of a preferred embodiment of the present disclosure includes other implementations, for example including another order or sequence different from the illustrated order or discussed order, or including a substantially simultaneous order or an inverse order of functions, which should be understood by those skilled in the art.

The logic and/or step described in other manners herein or shown in the flow chart, for example, a particular sequence table of executable instructions for realizing the logical function, may be specifically achieved in any computer readable medium to be used by the instruction execution system, device or equipment (such as the system based on computers, the system comprising processors or other systems capable of obtaining the instruction from the instruction execution system, device and equipment and executing the instruction), or to be used in combination with the instruction execution system, device and equipment. As to the specification, "the computer readable medium" may be any device adaptive for including, storing, communicating, propagating or transferring programs to be used by or in combination with the instruction execution system, device or equipment. More specific examples (a non-exhaustive list) of the computer readable medium comprise but are not limited to: an electronic connection (an electronic device) with one or more wires, a portable computer enclosure (a magnetic device), a random access memory (RAM), a read only memory (ROM), an erasable programmable read-only memory (EPROM or a flash memory), an optical fiber device and a portable compact disk read-only memory (CDROM). In addition, the computer readable medium may even be a paper or other appropriate medium capable of printing programs thereon, this is because, for example, the paper or other appropriate medium may be optically scanned and then edited, decrypted or processed with other appropriate methods when necessary to obtain the programs in an electric manner, and then the programs may be stored in the computer memories.

It should be understood that each part of the present disclosure may be realized by the hardware, software, firmware or their combination. In the above implementations, the multiple steps or methods may be realized by the software or firmware stored in the memory and executed by the appropriate instruction execution system. For example, if it is realized by the hardware, likewise in another embodiment, the steps or methods may be realized by one or a combination of the following techniques known in the art: a discrete logic circuit having a logic gate circuit for realizing a logic function of a data signal, an application-specific integrated circuit having an appropriate combination logic gate circuit, a programmable gate array (PGA), a field programmable gate array (FPGA), etc.

It would be understood by those skilled in the art that all or a part of the steps carried by the method in the above-described embodiments may be completed by relevant hardware instructed by a program. The program may be stored in a computer readable storage medium. When the program is executed, one or a combination of the steps of the method in the above-described embodiments may be completed.

In addition, individual functional units in the embodiments of the present disclosure may be integrated in one processing module or may be separately physically present, or two or more units may be integrated in one module. The integrated module as described above may be achieved in the form of hardware, or may be achieved in the form of a software functional module. If the integrated module is achieved in the form of a software functional module and sold or used as a separate product, the integrated module may also be stored in a computer readable storage medium.

The storage medium mentioned above may be read-only memories, magnetic disks or CD, etc. Although explanatory embodiments have been shown and described, it would be appreciated by those skilled in the art that the above embodiments cannot be construed to limit the present disclosure, and changes, alternatives, and modifications can be made in the embodiments without departing from scope of the present disclosure.

What is claimed is:

1. A method for image processing, applicable to an electronic device, and the method comprising:
   acquiring a background image and a portrait region image of a current scene of a current user, a preset parameter of the background image matching the preset parameter of the portrait region image; and
   merging the portrait region image and the background image to obtain a merged image;
   wherein the preset parameter comprises current scene brightness of the current scene, and acquiring the background image and the portrait region image of the current scene of the current user comprises:
      in response to detecting that brightness of a preset virtual background image is lower than the current scene brightness, adding a virtual light source to a virtual background image based on a brightness difference between the brightness of the preset virtual background image and the current scene brightness, such that brightness of the virtual background image matches the current scene brightness.

2. The method of claim 1, wherein acquiring the background image and the portrait region image of the current user further comprises:
   detecting the current scene brightness of the current scene and acquiring a virtual background image matching the current scene brightness; or
   in response to detecting that the current scene brightness does not match brightness of a virtual background image based on preset brightness matching information, obtaining an adjustment difference between the brightness of the virtual background image and the current scene brightness based on the brightness matching information; and adjusting an image parameter of the virtual background image based on the adjustment difference, such that the brightness of the virtual background image matches the current scene brightness; or
   acquiring a component element in a scene where the current user is located, and processing the component element in a preset image processing manner to generate a virtual background image; in response to detecting that brightness of the virtual background image is lower than the current scene brightness, simulating a sound of turning on a light, and adding a virtual light source to the virtual background image based on a brightness difference between the current scene brightness and the brightness of the virtual background image, such that the brightness of the virtual background image matches the current scene brightness; or
   in response to detecting that brightness of a preset virtual background image is higher than a portrait brightness, turning on a fill light based on a brightness difference between the portrait brightness and the brightness of the preset virtual background image and a user position of the user to illuminate the current user, such that the portrait brightness matches the brightness of the virtual background image;
   and
   acquiring a scene image of the current user; acquiring a depth image of the current user; and processing the scene image and the depth image to extract a portrait region of the current user from the scene image, to obtain the portrait region image;
   or
   wherein acquiring the background image and the portrait region image of the current user comprises:
      detecting the current scene brightness,
      in response to detecting that brightness of a preset virtual background image is lower than the current scene brightness and a brightness difference between the brightness of the preset virtual background image and the current scene brightness is greater than a preset threshold, determining exposure time for shooting the current user based on the brightness difference;
      capturing a scene image of the current user based on the exposure time;
      acquiring a depth image of the current user; and
      processing the scene image and the depth image to extract a portrait region of the current user from the scene image, to obtain the portrait region image; and
   wherein merging the portrait region image and the background image to obtain the merged image comprises:
      merging the portrait region image and the virtual background image to obtain the merged image.

3. The method of claim 2, wherein
   detecting the current scene brightness of the current scene and acquiring the virtual background image matching the current scene brightness comprises:
   querying a preset virtual image library to obtain a virtual background template having first brightness matching the current scene brightness; and
   acquiring the virtual background image corresponding to the virtual background template having the first brightness.

4. The method of claim 3, further comprising:
   in a case where the virtual background template having the first brightness matching the current scene brightness is not acquired, determining a virtual background template having second brightness closest to the current scene brightness;

adjusting the current scene brightness until detecting that the current scene brightness is adjusted to target scene brightness corresponding to the virtual background template having the second brightness; and acquiring a virtual background image corresponding to the virtual background template having the second brightness.

5. The method of claim 2, wherein adjusting the image parameter of the virtual background image based on the adjustment difference comprises:

adjusting a brightness parameter of an HSV (hue, saturation, value) color model of the virtual background image based on the adjustment difference; or adjusting a preset parameter of a CCM (color correction matrix) model corresponding to the virtual background image based on the adjustment difference.

6. The method of claim 5, wherein adjusting the brightness parameter of the HSV color model of the virtual background image based on the adjustment difference comprises:

acquiring brightness adjustment coefficients corresponding to different regions of the virtual background image;

calculating an adjustment difference corresponding to each different region based on the brightness adjustment coefficient corresponding to each different region; and adjusting brightness corresponding to pixel positions in each different region in the HSV color model based on the adjustment difference corresponding to each different region.

7. The method of claim 2, wherein turning on the fill light based on the brightness difference between the portrait brightness and the brightness of the preset virtual background image and the user position of the user to illuminate the current user comprises:

querying fill-light information corresponding to a preset fill light, and acquiring a light source compensation intensity matching the brightness difference and a projection direction corresponding to the user position; and turning on the preset fill light based on the projection direction and the light source compensation intensity to illuminate the current user; or arranging one or more types of fill light sources in a current scene; querying preset fill light adjustment information based on a position of each type of fill light source, and acquiring target working state data corresponding to the brightness difference and the user position; and adjusting a working parameter of the fill light source at the position based on the target working state data.

8. The method of claim 2, wherein acquiring the depth image of the current user comprises:

projecting structured light onto the current user;
capturing a structured light image modulated by the current user based on the exposure time; and
demodulating phase information corresponding to each pixel of the structured light image to obtain the depth image.

9. The method of claim 2, wherein processing the scene image and the depth image to extract the portrait region of the current user from the scene image, to obtain the portrait region image comprises:

identifying a face region in the scene image;
acquiring depth information corresponding to the face region from the depth image;
determining a depth range of the portrait region based on the depth information of the face region; and
determining the portrait region connected with the face region and having a depth within the depth range based on the depth range of the portrait region, to obtain the portrait region image.

10. The method of claim 1, wherein adding the virtual light source to the virtual background image based on the brightness difference between the current scene brightness and the brightness of the virtual background image comprises:

querying fill-light information corresponding to a preset virtual light source, to acquire a light source compensation intensity matching the brightness difference and a projection direction; and adding the virtual light source to the virtual background image based on the light source compensation intensity and the projection direction; or arranging one or more types of virtual light sources in the virtual background image; querying preset fill-light adjustment information based on a position of each type of virtual light source, and acquiring target working state data corresponding to the brightness difference; and adjusting a working parameter of the virtual light source at the position based on the target working state data.

11. An apparatus for image processing, integrated in an electronic device, comprising:

a visible light camera;
a depth image collection component,
wherein the visible light camera and the depth image collection component are configured to acquire a background image and a portrait region image of a current scene of a current user, a preset parameter of the background image matching the preset parameter of the portrait region image; and a processor, configured to:
merge the portrait region image and the background image to obtain a merged image
wherein the preset parameter comprises current scene brightness of the current scene, and
wherein the visible camera and the depth image collection component are further configured to acquire the background image and the portrait region image of the current scene of the current user by: adding a virtual light source to a virtual background image based on a brightness difference between brightness of a preset virtual background image and the current scene brightness, in response to detecting that the brightness of the preset virtual background image is lower than the current scene brightness, such that brightness of the virtual background image matches the current scene brightness.

12. The apparatus of claim 11, wherein,
the visible camera and the depth image collection component are further configured to acquire the background image and the portrait region image of the current user by:

detecting the current scene brightness of the current scene and acquiring a virtual background image matching the current scene brightness; or
in response to detecting that the current scene brightness does not match brightness of a virtual background image based on preset brightness matching information, obtaining an adjustment difference between the brightness of the virtual background image and the current scene brightness based on the brightness matching information; and adjusting an image parameter of the virtual background image based on the adjustment difference, such that the brightness of the virtual background image matches the current scene brightness; or acquiring a component element in a scene where the current user is located, and processing the component element in a preset image processing manner to generate a virtual background image; in response to detecting that brightness of the virtual background image is lower than the current scene brightness, simulating a sound of turning on a light, and adding a virtual light source to the virtual background image based on a brightness difference between the current scene brightness and the brightness of the virtual background image, such that the brightness of the virtual background image matches the current scene brightness; or in response to detecting that brightness of a preset virtual background image is higher than a portrait brightness, turning on a fill light based on a brightness difference between the portrait brightness and the brightness of the preset virtual background image and a user position of the user to illuminate the current user, such that the portrait brightness matches the brightness of the virtual background image; and acquiring a scene image of the current user; acquiring a depth image of the current user; and processing the scene image and the depth image to extract a portrait region of the current user from the scene image, to obtain the portrait region image;

or wherein the visible camera and the depth image collection component are further configured to acquire the background image and the portrait region image of the current user by:

detecting the current scene brightness, in response to detecting that brightness of a preset virtual background image is lower than the current scene brightness and a brightness difference between the brightness of the preset virtual background image and the current scene brightness is greater than a preset threshold, determining exposure time for shooting the current user based on the brightness difference;

capturing a scene image of the current user based on the exposure time;

acquiring a depth image of the current user; and processing the scene image and the depth image to extract a portrait region of the current user from the scene image, to obtain the portrait region image;

and wherein the processor is configured to merge the portrait region image and the background image to obtain a merged image by: merging the portrait region image and the virtual background image to obtain the merged image.

13. The apparatus of claim 12, wherein acquiring the depth image of the current user comprises:

projecting structured light onto the current user;

capturing a structured light image modulated by the current user based on the exposure time; and demodulating phase information corresponding to each pixel of the structured light image to obtain the depth image.

14. The apparatus of claim 12, wherein processing the scene image and the depth image to extract the portrait region of the current user from the scene image, to obtain the portrait region image comprises:

identifying a face region in the scene image;

acquiring depth information corresponding to the face region from the depth image;

determining a depth range of the portrait region based on the depth information of the face region; and determining the portrait region connected with the face region and having a depth within the depth range based on the depth range of the portrait region, to obtain the portrait region image.

15. A non-transitory computer readable storage medium, comprising a computer program, wherein the computer program when executed by a processor implements an image processing method, the method comprising:

acquiring a background image and a portrait region image of a current scene of a current user, a preset parameter of the background image matching the preset parameter of the portrait region image; and merging the portrait region image and the background image to obtain a merged image wherein the preset parameter comprises current scene brightness of the current scene, and acquiring the background image and the portrait region image of the current scene of the current user comprises:

in response to detecting that brightness of a preset virtual background image is lower than the current scene brightness, adding a virtual light source to a virtual background image based on a brightness difference between the brightness of the preset virtual background image and the current scene brightness, such that brightness of the virtual background image matches the current scene brightness.

\* \* \* \* \*